US009451505B2

(12) United States Patent
Zhao et al.

(10) Patent No.: US 9,451,505 B2
(45) Date of Patent: Sep. 20, 2016

(54) METHODS AND APPARATUS FOR HANDLING FAILURE AND RETRY MECHANISMS DURING EHRPD PRE-REGISTRATION

(75) Inventors: Suli Zhao, San Diego, CA (US); Srinivasan Balasubramanian, San Diego, CA (US); Ajith Tom Payyappilly, San Diego, CA (US); Vaibhav Kumar, San Diego, CA (US); Shian-De Ju, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 13/523,838

(22) Filed: Jun. 14, 2012

(65) Prior Publication Data

US 2013/0100795 A1 Apr. 25, 2013

Related U.S. Application Data

(60) Provisional application No. 61/549,719, filed on Oct. 20, 2011.

(51) Int. Cl.
*H04W 36/00* (2009.01)
*H04W 88/06* (2009.01)
*H04W 76/02* (2009.01)

(52) U.S. Cl.
CPC ....... *H04W 36/0016* (2013.01); *H04W 76/028* (2013.01); *H04W 88/06* (2013.01)

(58) Field of Classification Search
CPC .......... H04W 88/06; H04W 36/0016; H04W 80/04; H04W 60/00; H04W 36/0011; H04W 52/0229; H04W 36/00; H04W 28/04; H04W 48/16; H04W 88/02; H04W 76/027; H04W 60/04; H04W 36/08
USPC ........ 370/216, 230, 254, 331, 338; 709/224, 709/227, 230; 455/434, 436, 452.1, 435.1, 455/435.2
See application file for complete search history.

(56) References Cited

U.S. PATENT DOCUMENTS

2004/0229612 A1 11/2004 Narayanan et al.
2006/0114859 A1 6/2006 Sudo et al.
(Continued)

FOREIGN PATENT DOCUMENTS

EP 2464168 A1 6/2012
JP 2007324635 A 12/2007
(Continued)

OTHER PUBLICATIONS

"3rd Generation Partnership Project; Technical Specification Group Radio Access Network; Improved Network Controlled Mobility between E-UTRAN and 3GPP2/Mobile WiMAX Radio Technologies (Release 9 )", 3GPP Standard; 3GPP TR 36.938, 3rd Generation Partnership Project (3GPP), Mobile Competence Centre ; 650, Route Des Lucioles ; F-06921 Sophia-Antipolis Cedex; France, No. V9.0.0, Dec. 21, 2009, pp. 1-34, XP050401521, [retrieved on Dec. 21, 2009] pp. 10-14, paragraph 6.2.3.1-6.2.3.3 p. 31, paragraph 8.1.
(Continued)

*Primary Examiner* — Alpus H Hsu
*Assistant Examiner* — Dharmesh Patel
(74) *Attorney, Agent, or Firm* — Arent Fox LLP

(57) ABSTRACT

Aspects disclosed herein relate to effectively handling failure and retry mechanisms during pre-registration for an eHRPD optimized handover. In one example, a UE may be equipped to detect one or more instances of failure during a pre-registration procedure as part of an optimized handover process. The UE may further be equipped to perform one or more pre-registration retry processes based on the detected one or more instances of failure. In one aspect, the one or more instances of failure may include any combination of a permanent LTE connection failure, a temporary LTE connection failure, a session negotiation failure, a virtual connection failure when bringing up a data call, a link control protocol (LCP) failure, etc.

44 Claims, 11 Drawing Sheets

(56) References Cited

U.S. PATENT DOCUMENTS

| | | |
|---|---|---|
| 2008/0259876 A1 | 10/2008 | Qiang et al. |
| 2009/0103455 A1* | 4/2009 | Balasubramanian ... H04W 8/06 370/254 |
| 2009/0116377 A1* | 5/2009 | Nylander et al. ............. 370/216 |
| 2009/0207805 A1* | 8/2009 | Zou ............................... 370/331 |
| 2010/0075680 A1 | 3/2010 | Ramachandran et al. |
| 2010/0177629 A1* | 7/2010 | Payyappilly et al. ........ 370/216 |
| 2010/0268981 A1* | 10/2010 | Xiang ............................... 714/2 |
| 2011/0044264 A1* | 2/2011 | Chen et al. .................... 370/329 |
| 2011/0076982 A1* | 3/2011 | Li ........................ H04W 48/18 455/404.1 |
| 2011/0149725 A1 | 6/2011 | Zhao et al. |
| 2011/0176511 A1 | 7/2011 | Sayeedi |
| 2011/0200010 A1* | 8/2011 | Hu et al. ....................... 370/331 |
| 2011/0242975 A1* | 10/2011 | Zhao et al. ................... 370/230 |
| 2011/0249587 A1 | 10/2011 | Deng et al. |
| 2012/0051328 A1* | 3/2012 | Swaminathan ... H04W 36/0016 370/332 |
| 2012/0127992 A1* | 5/2012 | Sun ................... H04M 3/42314 370/389 |

FOREIGN PATENT DOCUMENTS

| | | | |
|---|---|---|---|
| JP | 2011040822 A | 2/2011 | |
| WO | WO 2010036738 A2 * | 4/2010 | ............ H04W 60/00 |
| WO | 2010115314 A1 | 10/2010 | |

OTHER PUBLICATIONS

International Search Report and Written Opinion—PCT/US2012/060246—ISA/EPO—Jan. 10, 2013.

Translation of first office action for Japanese Application No. 2014-537139 dated May 19, 2015, pp. 1-7.

English Translation of the Notice of Grounds for Rejection from counterpart Korean Patent Application No. 2014-7013588, dated Jun. 29 2015, 3 pp.

\* cited by examiner

METHODS AND APPARATUS FOR HANDLING FAILURE AND RETRY MECHANISMS DURING EHRPD PRE-REGISTRATION

CLAIM OF PRIORITY UNDER 35 U.S.C. §119

The present Application for Patent claims priority to Provisional Application No. 61/549,719 entitled "METHODS AND APPARATUS FOR HANDLING FAILURE AND RETRY MECHANISMS DURING eHRPD PRE-REGISTRATION" filed Oct. 20, 2011, and assigned to the assignee hereof and hereby expressly incorporated by reference herein.

BACKGROUND

1. Field

The present disclosure relates generally to communication systems, and more particularly, to a user equipment (UE) based process to effectively handle failure and retry mechanisms during pre-registration for an evolved high rate packet data (eHRPD) optimized handover.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with effectively handling failure and retry mechanisms during pre-registration for an eHRPD optimized handover. In one example, a UE may be equipped to detect one or more instances of failure during a pre-registration procedure as part of an optimized handover process. The UE may further be equipped to perform one or more pre-registration retry processes based on the detected one or more instances of failure.

According to related aspects, a method for effectively handling failure and retry mechanisms during pre-registration for an eHRPD optimized handover. The method can include detecting, by a UE, one or more instances of failure during a pre-registration procedure as part of an optimized handover process. Moreover, the method can include performing, by the UE, one or more pre-registration retry processes based on the detected one or more instances of failure.

Another aspect relates to a communications apparatus. The wireless communications apparatus can include means for detecting, by a UE, one or more instances of failure during a pre-registration procedure as part of an optimized handover process. Moreover, the communications apparatus can include means for performing, by the UE, one or more pre-registration retry processes based on the detected one or more instances of failure.

Another aspect relates to a communications apparatus. The apparatus can include a pre-registration failure module configured to detect one or more instances of failure during a pre-registration procedure as part of an optimized handover process. Moreover, the pre-registration failure module may be configured to perform one or more pre-registration retry processes based on the detected one or more instances of failure.

Another aspect relates to a computer program product, which can have a computer-readable medium comprising code for detecting, by a UE, one or more instances of failure during a pre-registration procedure as part of an optimized handover process. Moreover, the computer-readable medium can include code for performing, by the UE, one or more pre-registration retry processes based on the detected one or more instances of failure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
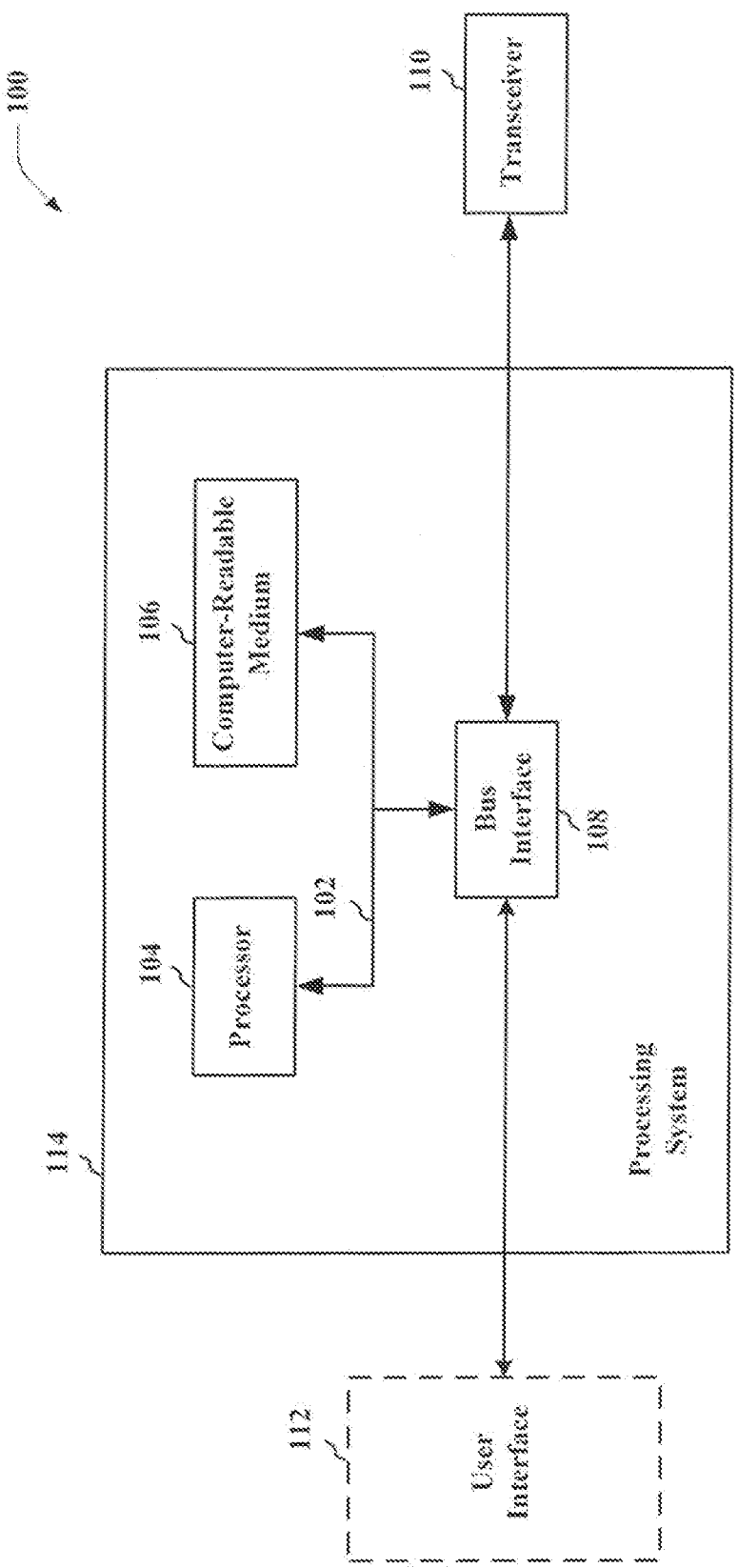
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
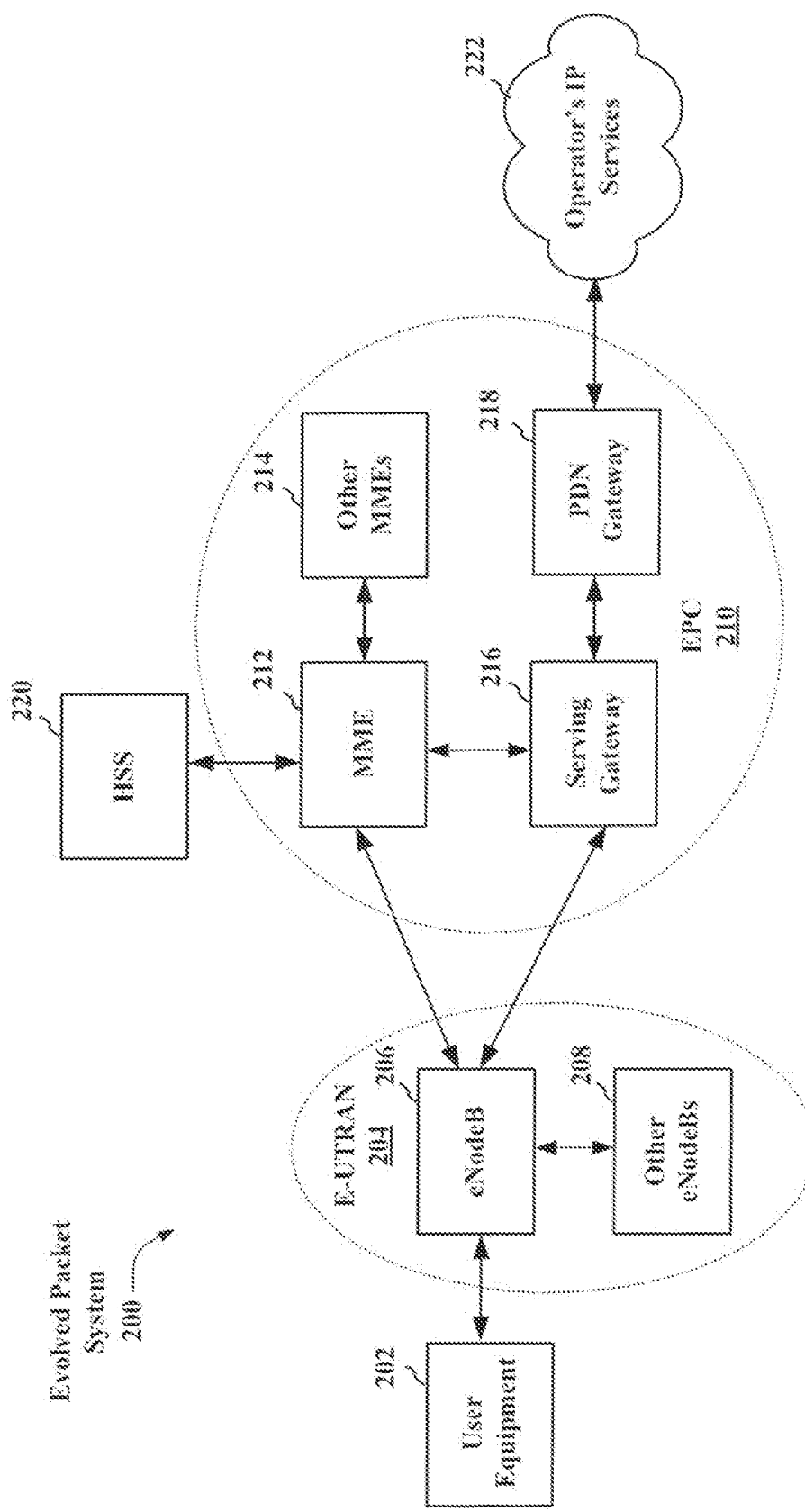
FIG. 2 is a diagram illustrating an example of a network architecture.

FIG. 2 is a diagram illustrating a LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interlaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 may include the Internet, the Intranet, an IP Multimedia Subsystem (IMS), and a PS Streaming Service (PSS).

Figure 3:
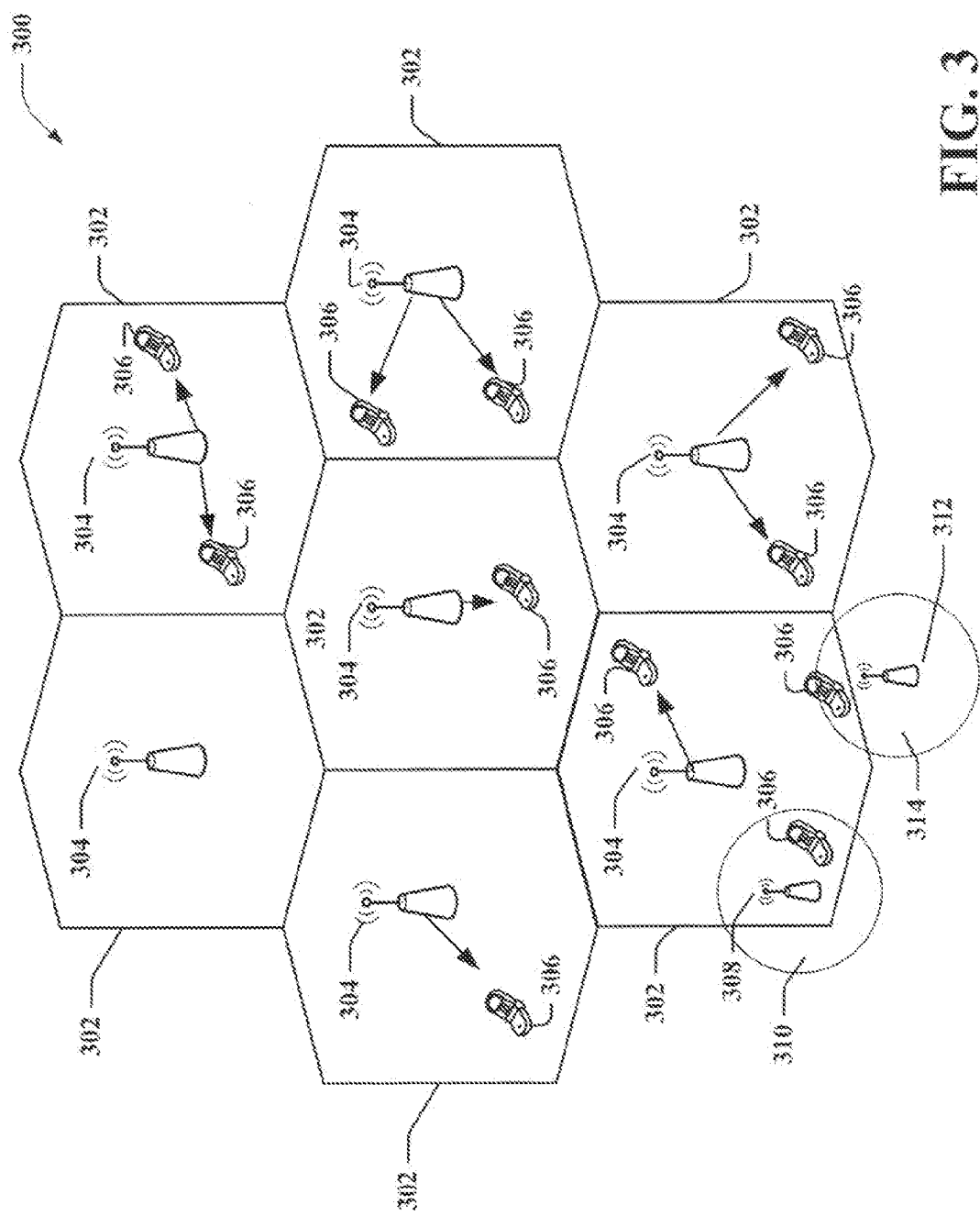
FIG. 3 is a diagram illustrating an example of an access network.

FIG. 3 is a diagram illustrating an example of an access network in a LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDM A. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 4:
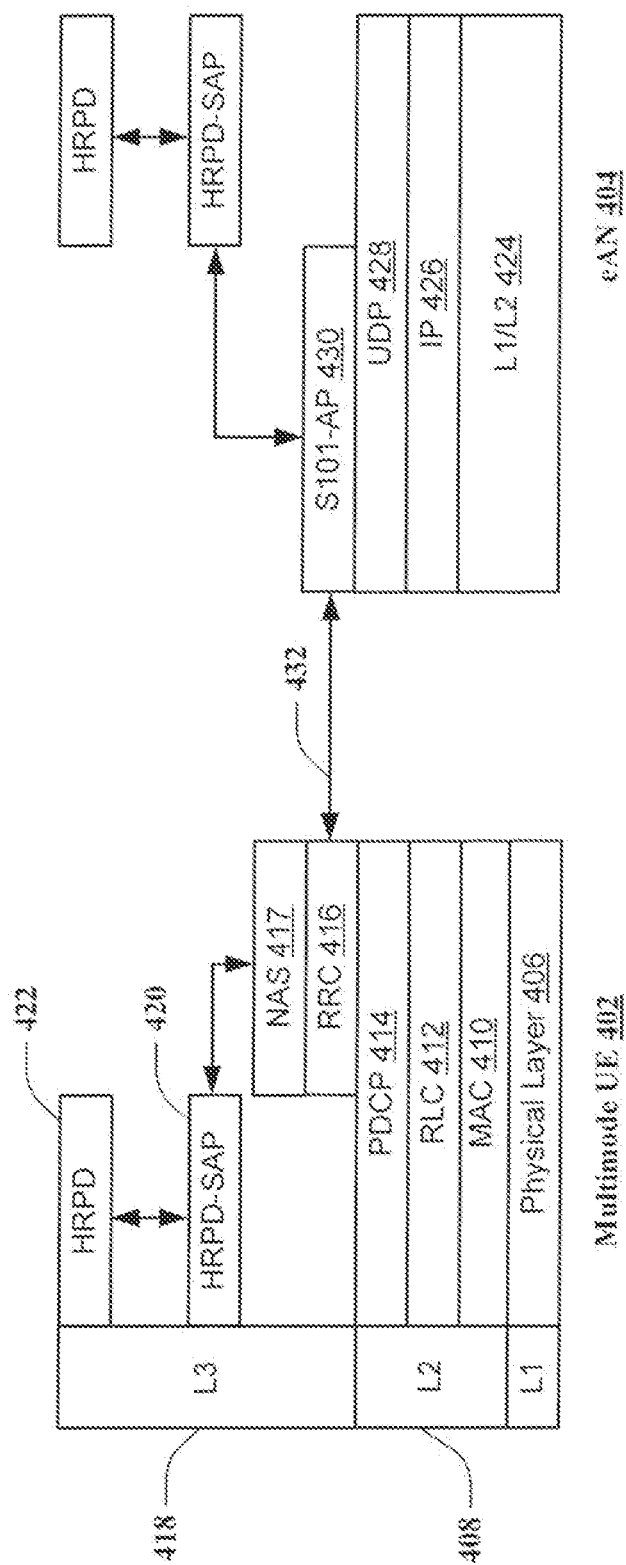
FIG. 4 is a diagram illustrating an example of a radio protocol architecture for use during eHRPD optimized handover pre-registration.

The radio protocol architecture may take on various forms depending on the particular application. An example for an LTE system multimode UE 402 that is operable to tunnel eHRPD pre-registration information to an evolved access node (eAN) 404 will now be presented with reference to FIG. 4. FIG. 4 is a conceptual diagram illustrating an example of the radio protocol architecture for the multimode UE 402 and eAN 404.

Turning to FIG. 4, the radio protocol architecture for UE 402 that may communicate with an eNB is shown with three layers: Layer 1, Layer 2, and Layer 3. Layer 1 is the lowest layer and implements various physical layer signal processing functions. Layer 1 will be referred to herein as the physical layer 406. Layer 2 (L2 layer) 408 is above the physical layer 406 and is responsible for the link between the UE and eNB over the physical layer 406. Layer 3 (L3 layer)

418 is above the L2 layer 408 and is responsible for obtaining radio resources from a network in a control plane, and enabling application functionality in a user plane.

In the user plane, the L2 layer 408 includes a media access control (MAC) sublayer 410, a radio link control (RLC) sublayer 412, and a packet data convergence protocol (PDCP) 414 sublayer, which are terminated at the eNB on the network side.

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNBs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

In the user plane, the L3 layer 418 includes high rate packet data (HRPD) signaling adaptation protocol (SAP) 420, and various HRPD layers 422. In one aspect, HRPD layers 422 may include, but are not limited to, HRPD port control protocol (PCP), HRPD stream protocol, HRPD signaling layer protocol (SLP), HRPD signaling network protocol (SNP), and HPRD multi-flow packet application (MFPA), enhanced multi-flow packet application (EMPA), multi-link multi-flow packet application (MMPA).

In the control plane, the radio protocol architecture for the UE and eNB is substantially the same for the physical layer 406 and the L2 layer 408 with the exception that there is no header compression function for the control plane. The control plane also includes a radio resource control (RRC) sublayer 416 in Layer 3. The RRC sublayer 416 is responsible for obtaining radio resources (i.e., radio bearers) and for configuring the lower layers using RRC signaling between the eNB and the UE. Such signaling configuration 432 may be used to assist in tunneling eHRPD pre-registration information between the multimode UE 402 and eAN 404.

The radio protocol architecture for eAN 404 that may communicate with an MME includes an L1/L2 layer 424, an internet protocol (IP) layer 426, and a user datagram protocol layer 428. In the control plane, eAN 404 includes S101-AP 430 interface. The eAN 404 supports communications with an evolved packet core (EPC) Mobility Management Entity (MME) through the S101 interlace. In operation, the MME may facilitate communications between the UE 402, eNB and eAN 404. HRPD-SAP 420 in an HRPD connection layer protocol may be defined for S101 operation. HRPD-SAP 420 keeps track of the UE's 402 serving air interlace and determines whether HRPD signaling messages will be transmitted using the direct HRPD mode of operation or be routed over a LTE tunnel 432. HRPD-SAP communicates information with LTE-RCC 416 through non-access stratum (NAS) 417. For example, if the UE is in the tunnel operation mode 432, transmitted signaling adaptation packets are forwarded to LTE-RRC 416 via NAS 417 and sent via the S101 tunnel 432 to the S101-AP 320 at eAN 404, and signaling adaptation packets received from the LTE-RRC 416 may be are forwarded to HRPD 422 (e.g., HRPD-PCP) via NAS 417.

Figure 5:
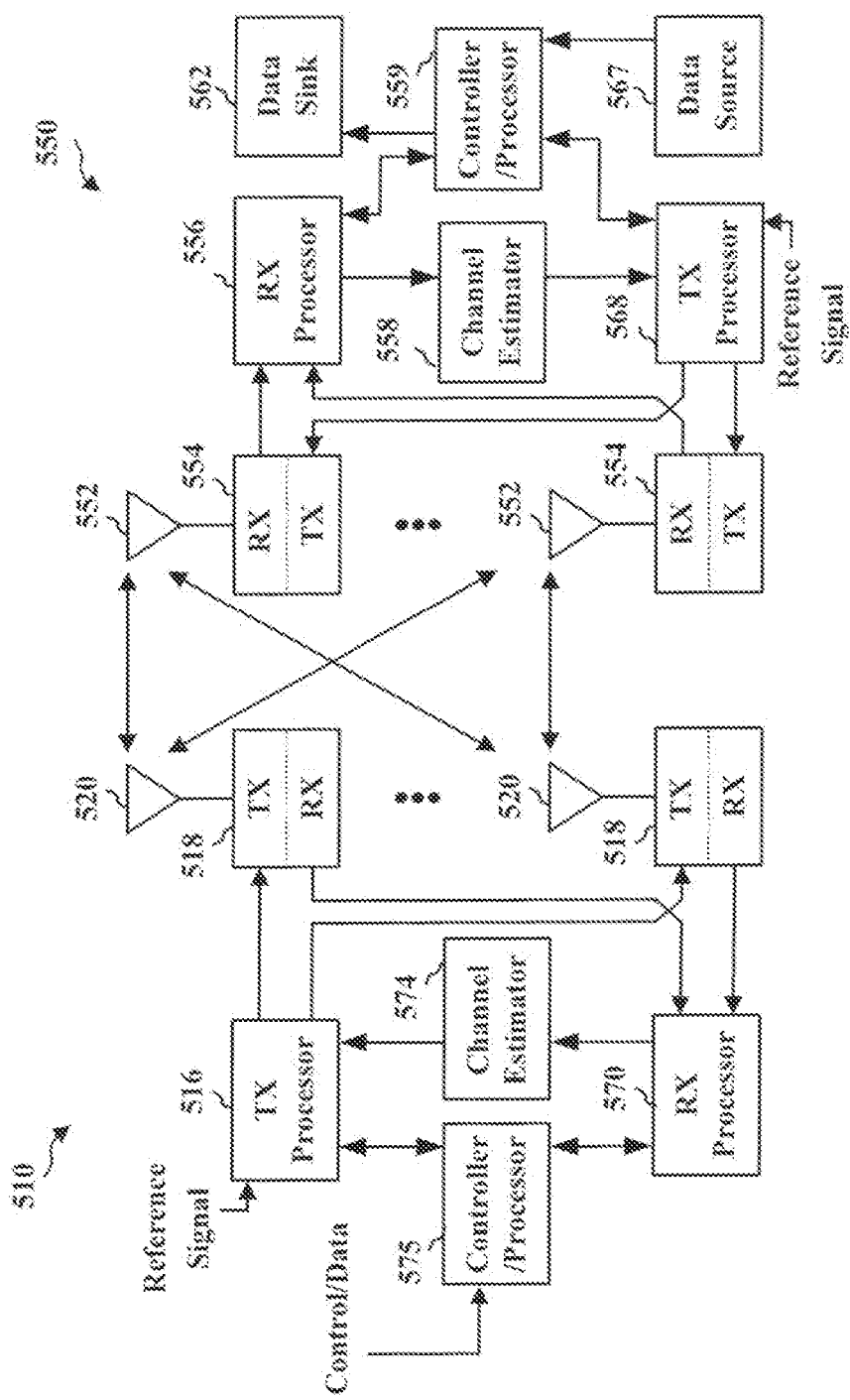
FIG. 5 is a diagram illustrating an example of an evolved Node B and user equipment in an access network.

FIG. 5 is a block diagram of an eNB 510 in communication with a UE 550 in an access network. In the DL, upper layer packets from the core network are provided to a controller/processor 575. The controller/processor 575 implements the functionality of the L2 layer described earlier in connection with FIG. 4. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The TX processor 516 implements various signal processing functions for the L1 layer (i.e., physical layer). The signal processing functions includes coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK). M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates an RF carrier with a respective spatial stream for transmission.

At the UE 550, each receiver 554RX receives a signal through its respective antenna 552. Each receiver 554RX recovers information modulated onto an RF carrier and provides the information to the receiver (RX) processor 556.

The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 510. These soft decisions may be based on channel estimates computed by the channel estimator 558. The soft decisions are then decoded and deinterleaved to recover the data and control signals that were originally transmitted by the eNB 510 on the physical channel. The data and control signals are then provided to the controller/processor 559.

The controller/processor 559 implements the L2 layer described earlier in connection with FIG. 4. In the UL, the control/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the UL, a data source 567 is used to provide upper layer packets to the controller/processor 559. The data source 567 represents all protocol layers above the L2 layer (L2). Similar to the functionality described in connection with the DL transmission by the eNB 510, the controller/processor 559 implements the L2 layer for the user plane and the control plane by providing header compression, ciphering, packet segmentation and reordering, and multiplexing between logical and transport channels based on radio resource allocations by the eNB 510. The controller/processor 559 is also responsible for HARQ operations, retransmission of lost packets, and signaling to the eNB 510.

Channel estimates derived by a channel estimator 558 from a reference signal or feedback transmitted by the eNB 510 may be used by the TX processor 568 to select the appropriate coding and modulation schemes, and to facilitate spatial processing. The spatial streams generated by the TX processor 568 are provided to different antenna 552 via separate transmitters 554TX. Each transmitter 554TX modulates an RF carrier with a respective spatial stream for transmission.

The UL transmission is processed at the eNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 implements the L1 layer.

The controller/processor 559 implements the L2 layer described earlier in connection with FIG. 4. In the UL, the control/processor 559 provides demultiplexing between transport and logical channels, packet reassembly, deciphering, header decompression, control signal processing to recover upper layer packets from the UE 550. Upper layer packets from the controller/processor 559 may be provided to the core network. The controller/processor 559 is also responsible for error detection using an ACK and/or NACK protocol to support HARQ operations.

The processing system 114 described in relation to FIG. 1 includes the UE 550. In particular, the processing system 114 includes the TX processor 568, the RX processor 556, and the controller/processor 559.

Figure 6:
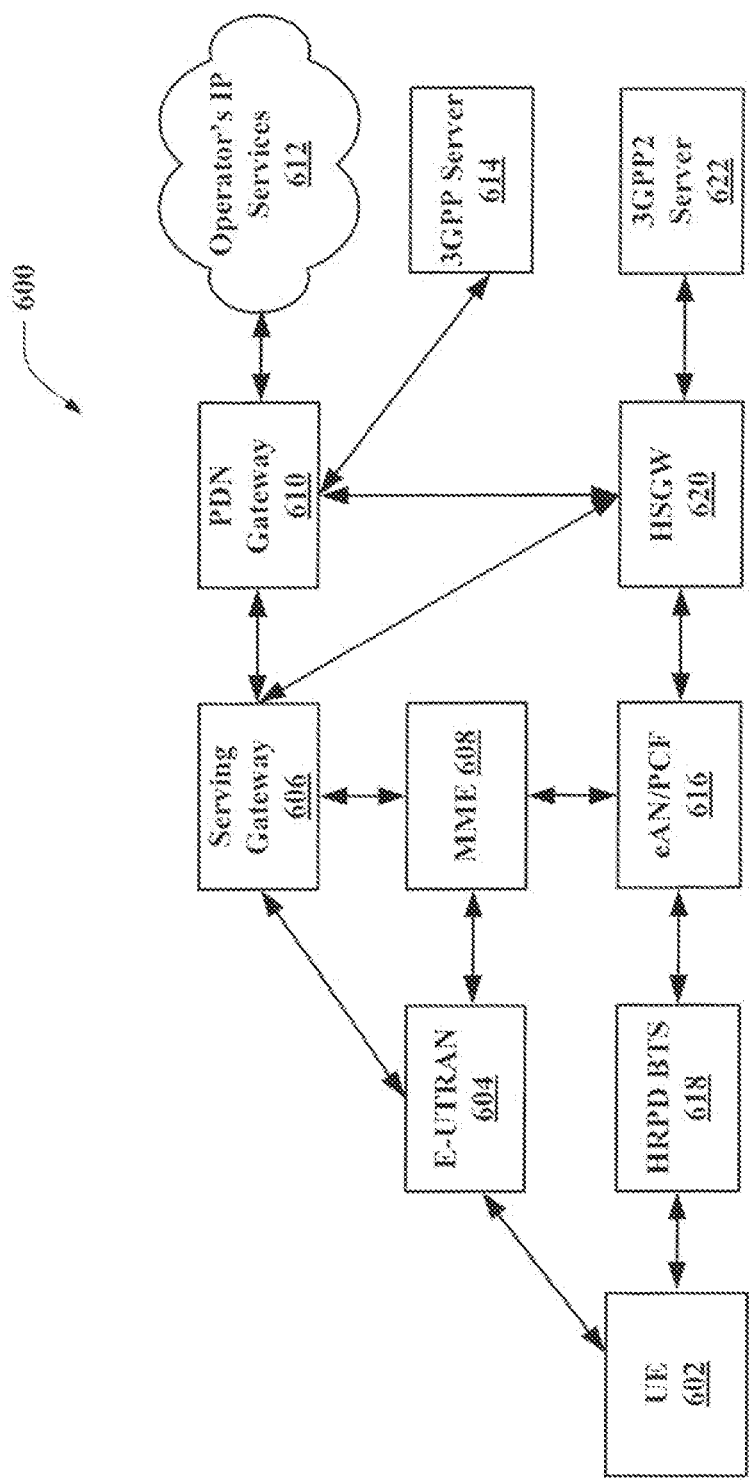
FIG. 6 is a diagram illustrating an example access network according to an aspect.

FIG. 6 is a diagram illustrating a network architecture 600 employing various apparatuses 100 (See FIG. 1). Network architecture 600 may include multiple access networks. One such access network may be referred to as an Evolved Packet System (EPS). The EPS may include one or more user equipment (UE) 602, an Evolved UMTS Terrestrial Radio Access Network (E-UTRAN) 604, an Evolved Packet Core (EPC) 610, a serving gateway (SGW) 606, a packet data network (PDN) gateway 610, an Operator's IP Services 612, and a 3GPP server 614. Further, network architecture 600 may include HRPD base station(s) (BTS) 618, an evolved access network/packet control function (eAN/PCF) 616, an eHRPD service gateway (HSGW) 620, and a 3GPP2 server 622. The above described EPS can be serviced by a 3GPP core network (e.g., 3GPP server 614), while the eHRPD based system may be serviced by a 3GPP2 core network (e.g., 3GPP2 server 622. As used herein, both HRPD and eHRPD sessions may be supported by an evolved data only (1×EV-DO) service. Further, an eHRPD session, along with an LTE session, also is served by the 3GPP core network 614. HSGW 620 in eHRPD is also connected to the PDN-Gateway 610 in a similar manner as serving gateway 606 is connected to PDN-gateway 610 in the LTE system. By contrast, in HRPD, an AN is connected to a PDSN that is connected to the 3GPP2 core network 622.

Generally, a multimode device (e.g., UE 602), may pre-register with the eHRPD based system to support optimized handover between the LTE and eHRPD systems. As used herein, optimized handover may refer to a handover from one technology with the radio and IP session context created on the target radio access technology (RAT) prior to transitioning to the target RAT. For eHRPD, the session context may include, the Radio Session, PPP Session including authentication, IP contexts, and quality of service (QoS) contexts created over eHRPD. By contrast, non-optimized handover refers to handover from one technology where the radio and/or IP context are not created over the target RAT prior to transitioning to the target RAT. A process may be considered non-optimized handover if any one of the four above described contexts is not created on eHRPD prior to transition. In one aspect, the HRPD radio session may be maintained, while the other three contexts may need to be recreated. Further, as used herein eHRPD direct mode operations refer to an operational mode in which the UE 602 is directly operating on the eHRPD radio interface (e.g., through HRPD BTS 618). By contrast, eHRPD tunneling mode operation may refer to an operational mode in which the UE 602 is not directly operating on the eHRPD radio interface. Rather, the UE 602 may operate over another RAT (e.g. E-UTRAN 604) and may connect to eAN 616 through a tunnel. In one aspect, a tunnel may be established between UE 602 and eAN 616 through E-UTRAN 605 and MME 608. Communications between MME 608 and eAN 616 may be supported using an S101 interface. During pre-registration, the UE 602 establishes and maintains a data only DO session and PPP and authentication context over eHRPD via the S101 interface between MME 608 and eAN 616. Additionally, at the L3 418 layer, the UE 602 establishes and maintains an IP context and QoS context over eHRPD to mirror the LTE context. In operation, UE 602 may be connected to the LTE network (e.g., EPS) in an RRC Idle or RRC connected mode. Further, UE 602 is operable to pre-register with the eHRPD network. In one aspect, the UE 602 may be determined to be operable for preregistration, when in RRC_CONNECTED state, the UE 602 receives, from the E-UTRAN 604, a RRCConnectionReconfiguration message which includes the preRegistrationInfoHRPD that sets preRegistrationAllowed to TRUE. In another example, UE may receive an SIB8 which includes preRegistrationInfoHRPD that sets preRegistrationAllowed to TRUE, and the UE has not received the preRegistrationInfoHRPD within a RRCConnectionReconfiguration message after entering this cell.

Pre-registration failure may occur at various steps associated with establishing and maintaining the above described contexts. Generally, UE 602 may perform pre-registration with the eHRPD network via S101 tunneling, through which the UE 602 creates an EVDO radio session and PPP/IP/QoS contexts for eHRPD before actual handoff to eHRPD. If the UE 602 encounters failures during pre-registration, which may be caused by LTE connection failures or eHRPD eAN/HSGW (616/620) network failures, the UE reattempts the pre-registration procedures in a LTE serving cell that allows pre-registration, until the eHRPD context for the EVDO radio session and PPP/IP/QoS contexts are successfully created.

Further, UE 602 may be operable to support multiple radio stacks, for example, an LTE stack and an eHRPD stack (as discussed with reference to FIG. 4). The HRPD stack may include HRPD protocols layer, which are responsible for EVDO radio session negotiation, and a data layer which is responsible for PPP/IP/QoS context creation. If the UE is operating at the eHRPD direct mode of operation and encounters failures during EVDO session negotiation, the current DO channel may be avoided and upon acquiring the next available channel, the UE 602 may reattempt session negotiation. The system avoidance function is not currently involved when the UE is operating in eHRPD tunnel mode of operation when using the S101 interface. Further, specific steps that UE 602 may follow in reattempting to establish PPP/IP/QoS contexts over the S101 interface alter encountering failures are not currently defined. If the UE 602 is operating at the eHRPD direct mode and encounters failures during PPP/IP/QoS context creation, the UE 602 may reattempt the procedure upon request of applications. However, if the UE 602 is operating in the eHRPD tunnel mode using the S101 interface, there is no interaction between the DO data layer and the applications.

Defining failure and retry mechanisms for use in an eHRPD tunneling operational mode allow for retry in a timely manner such that the UE 602 can create the eHRPD context before a possible actual handoff to eHRPD. Further, defined failure and retry mechanisms for use in an eHRPD tunneling operational mode allow the UE 602 to perform retries in a throttled manner such that the network is not congested by excessive requests. For this purpose, the UE 602 may look into the error reasons/cause codes and may respond differently based on different cause codes. Further, defined failure and retry mechanisms for use in an eHRPD tunneling operational mode allow the UE 602 to reduce LTE overhead for eHRPD pre-registration. If LTE information is available, the retry mechanisms also incorporate the LTE information to perform retries in a more efficient manner. Still further, defined failure and retry mechanisms for use in an eHRPD tunneling operational mode allow the UE 602 to account for the existing throttling mechanisms that the UE 602 performs upon encountering failures during a data call setup and/or PPP/IP setup in the eHRPD radio interface.

By way of example and not limitation, failures that occur during pre-registration may be categorized into the following failures. LTE connection failure scenarios for example are list Table 1. In one aspect, LTE connection failure may occur during session negotiations, establishment of a virtual connection, etc. These types of failure can be treated as either temporary or permanent LTE connection failures based on the failure reason. For example, Table 1 index 6 and index 9 may be treated as permanent LTE connection failures, while Table 1 indexes 1-5, 7, and 8 may be treated as temporary failures. Failures encountered while attempting to open a virtual connection for data call. eHRPD session negotiation failures, e.g., session negotiation timeout or network reject. EAP-AKA' service authentication failures. Authentication failure may be treated as PPP hard or soft failures, depending on the UE 602 configuration. Failures that occur during PPP/IP/QoS context creation may be treated as PPP soft failures.

TABLE 1

LTE Connection Failure Scenarios

| Index | Description | Native LTE Behavior description | Additional requirements |
|---|---|---|---|
| 1 | Step 3a (RA Preamble) is not initiated because Access Bar check fails on LTE. | Timers are started to avoid connection setups for a certain duration. Failure is indicated to NAS along with a value of the access barring timer. NAS aborts Service request and does not initiate service request until timer expires. (36.331 section 5.3.3 and 24.301 section 5.6.1.6) | Along with failure indication, NAS will inform HRPD stack of Access Bar timer. HRPD stack can re-attempt registration only after this timer expires. |
| 2 | RRC Connection establishment timeout. T300 timer expiry. | Inform upper layers about the failure to establish the RRC connection. (36.331 section 5.3.3.6). NAS will inform HRPD stack of failure. (24.301 section 5.6.1.6). | HRPD stack can re-attempt immediately. |
| 3 | Step 3a (RA Preamble) is not initiated because T302 or T303 is running | Same as Access bar check failure (see index 1). (36.331 section 5.3.3.2) | Along with failure indication, NAS will inform HRPD stack of Access Bar timer. HRPD stack can re-attempt only after this timer expires. |
| 4 | RRC Connection Reject | Start T302. Inform upper layers of failure and that access barring is in effect. | Along with failure indication, NAS will inform HRPD stack of Access Bar timer. HRPD stack can re-attempt only after this timer expires. |

TABLE 1-continued

LTE Connection Failure Scenarios

| Index | Description | Native LTE Behavior description | Additional requirements |
|---|---|---|---|
| 5 | After step 3e (Service Request), T3417 has expired while waiting for bearer setup or network response | Service request is aborted and HRPD stack is informed of failure. | HRPD stack can re-attempt immediately. |
| 6 | Service Reject received in response to SR. Cause code = {3, 6, 7, 9, 10, 11, 12, 13, 15, 25} | Detach from LTE network. Cause codes 9 and 10 require a new LTE attach. 24.301 section 5.6.1.6 | Pre-registration is aborted and HRPD stack is out of S101 mode. HRPD stack sets HRPDPreRegistration Allowed = False when the UE is detached from LTE. |
| 7 | Service Reject received in response to SR. Cause code != {3, 6, 7, 9, 10, 11, 12, 13, 15, 18, 25} | Service request is aborted and transition to EMM_REGISTERED. 24.301 section 5.6.1.6 case e | Inform HRPD stack of failure. HRPD stack can re-attempt immediately. |
| 8 | Lower layer failure after sending Service Request | Service request is aborted and transition to EMM_REGISTERED. 24.301 section 5.6.1.6 case b | Inform HRPD stack of failure. HRPD stack can re-attempt after serving system is re-acquired. |
| 9 | LTE OOS | LTE stack is deactivated | HRPD stack sets HRPDPreRegistration Allowed = False. |

Upon a determination that a pre-registration failure is not a result of either a temporary or permanent LTE connection failure, the UE may determine whether the pre-registration has reach one or more check points within the pre-registration process. By way of example and not limitation, Table 2 provides four check points.

TABLE 2

Pre-registration Procedure Failure Checkpoints

| Check Point Index for pre-registration procedures | Descriptions |
|---|---|
| 1 | HRPD session configuration (see e.g., acts 722, 724) |
| 2 | LCP negotiation and authentication (see, e.g., acts 726, 728a, 728b) |
| 3 (for each PDN connection) | PDN connection establishment (see, e.g., act 730) |
| 4 (for each dedicated bearer of each PDN connection) | QoS context establishment (see, e.g., act 732) |

In one aspect, UE 602 may maintain a backoff timer for each retried procedure, e.g., PreRegBackoffTimer_DOSession, PreRegBackoffTimer_LCP, PreRegBackoffTimer_PDN1, PreRegBackoffTimer_QOS, etc. A pre-registration backoff timer may be started at a time when the UE 602 fails in performing the associated pre-registration procedure. Generally, the UE may not retry the failed procedure until the associated Pre-registration backoff timer has expired. As noted in Table 2, checkpoints 1 through 4 may be discussed with reference to the call flow diagram described in FIG. 7.

Figure 7:
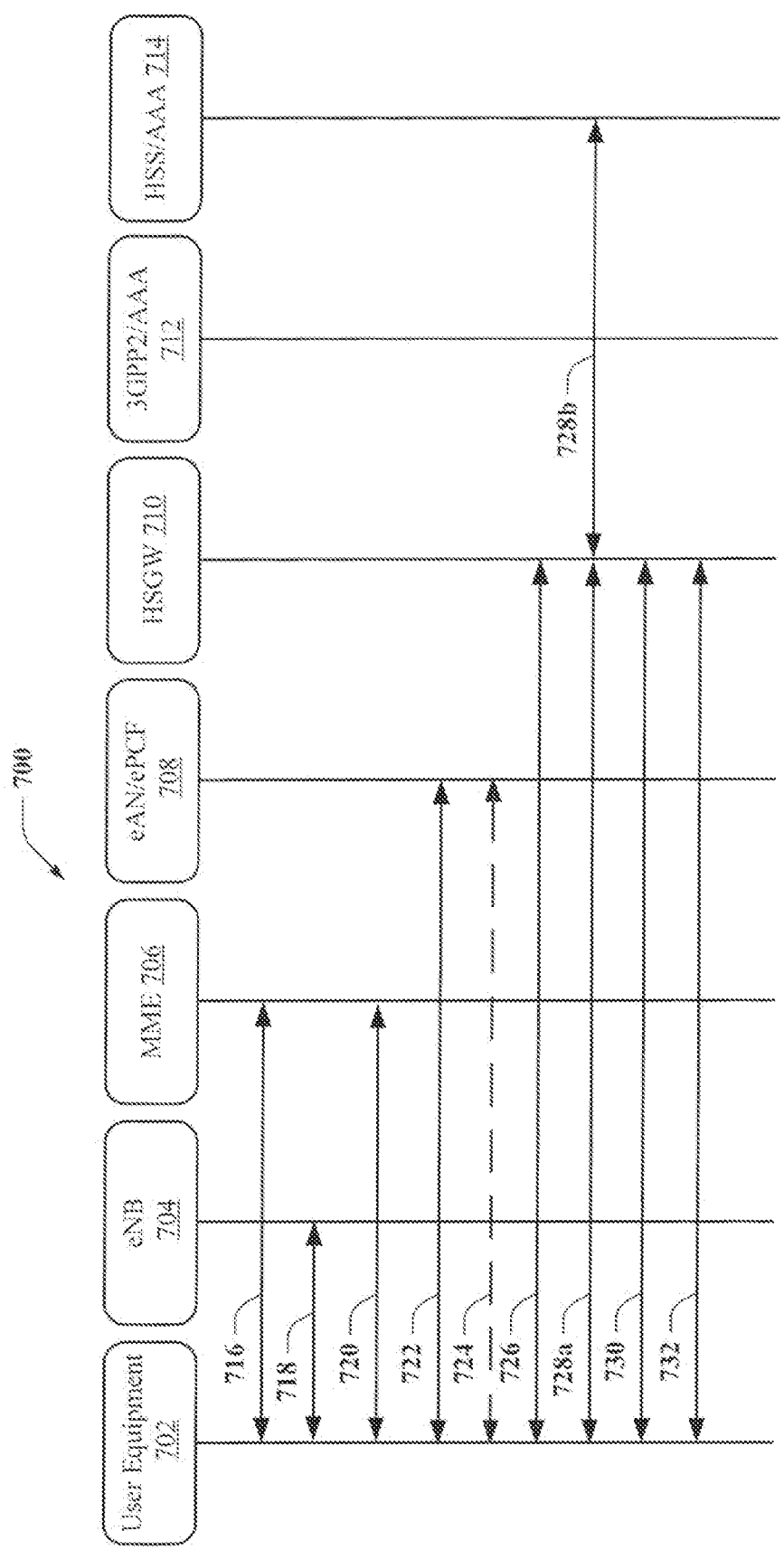
FIG. 7 is a call-flow diagram illustrating an eHRPD setup procedure.
Figure 8:
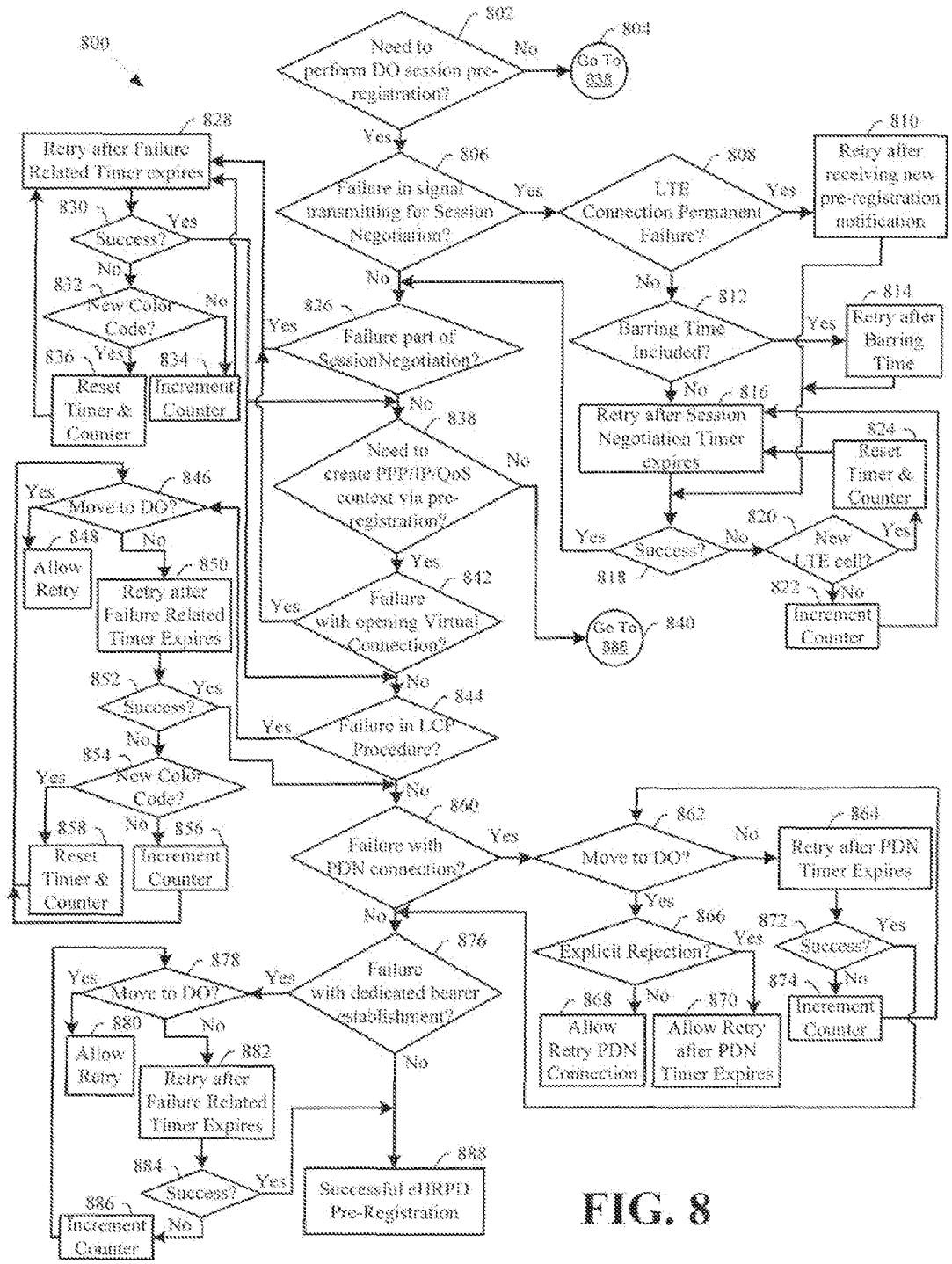
FIG. 8 is a flow chart of a method of wireless communication according to an aspect.
Figure 10:
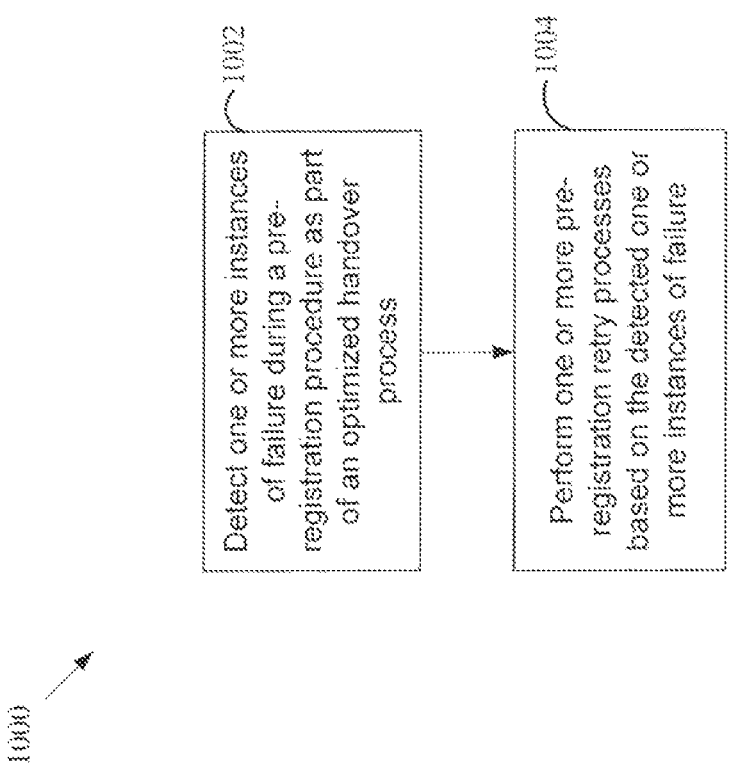
FIG. 10 is a flow chart of another method of wireless communication according to an aspect.

FIGS. 7, 8, and 10 illustrate various methodologies in accordance with various aspects of the presented subject matter. While, for purposes of simplicity of explanation, the methodologies are shown and described as a series of acts, blocks, or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 is a call-flow diagram illustrating an example eHRPD pre-registration procedure in an access network 700. Access network 700 may include UE 702, an eNB, an MME 706, an evolved access network/packet control function (eAN/PCF) 708, an eHRPD serving gateway (HSGW) 710, a 3GPP2 authentication authorization accounting (AAA) server 712 and a home subscriber server (HSS) AAA server 714.

At act 716, UE 702 may be registered with MME 706. In one aspect, UE 702 may have an ongoing data session established over EPS/E-UTRAN access. Based on a triggering occurrence, at act 718, UE 702 may decide to initiate a pre-registration procedure with potential target eHRPD access through eNB 704. The pre-registration procedure allows the UE 702 to establish and maintain a dormant session in the target eHRPD access, while attached to the MME 706. In one aspect, a S101 signaling relationship exists between the MME 706 and eAN/ePCF 708. At act 720, UE 702 may initiate a NAS service request message sent through the RCC layer to MME 706 to establish an RRC connection with an initial context. In one aspect, act 720 may include steps, such as, UE 702 requesting a lower layer to establish a RRC connection by starting a random access channel (RACH) procedure where the UE 702 sends the RA Preamble. Once a preamble is detected by the eNB 704, eNB 704 responds with a Random Access Response (RAR) message. This message provides information that UE 702 transmits on the Uplink, including the Uplink Grant, the Timing Advance, and TC-RNTI. The UE sends the RRC-ConnectionRequest message including 'MO-Data' as the Establishment Cause, and a UE Contention Resolution Identity. The eNB 704 responds with a RRCConnectionSetup message. If this message contains the UE identity transmitted previously, the UE considers the RA contention resolved and the UE 702 sends a RRCConnectionSetupComplete message which includes a NAS Service Request message as an information element (IE). Upon receiving the RRCConnectionSetupComplete message, eNB 704 extracts the NAS Service Request message and transports it to the MME 706 using the S1 Initial UE Message. The MME 706 sends the S1AP Initial Context Setup Request message to the eNB 704 including information used by eNB 706 to build a new E-RAB configuration. Upon receiving the Initial Context Setup Request message, the eNB 708 sets up the radio bearers accordingly and sends a RRCConnectionReconfiguration message to UE 702 to modify the radio bearer. The UE 702 responds with a RRCConnectionReconfiguration-Complete message. The eNB 704 sends an S1AP Initial Context Setup Response message to indicate the E-RABs that have been successfully established.

At act 722, UE 702 may initiate establishment of a new session in the eHRPD system through a S101 tunnel. In such an aspect, UE may configure a DO Rev B personality. The eHRPD signaling is tunneled transparently between the eHRPD-stack of the UE 702 and the eAN 708 via the LTE-stack of the UE 702, the eNB 704, and MME 706. At optional act 724, if RAN level authentication is required, UE 702 may perform RAN level authentication with eAN 708 using an A12 interface. In one aspect, during failure detection, a determination of successful completion of acts 722 and 724 may result in a checkpoint completion indication. In such an aspect, any pre-registration retry process may start after the act(s) indicating the successfully completed checkpoint. Further, eAN/ePCF 708 may establish an A10 connection with the HSGW 710 by exchanging A11-RRQ/RRP messages. The A11-Registration Request message may include an indication that the access is occurring through the S101 tunnel. This information may be used by the HSGW 710 at act 726 to defer interaction with a PDN-GW. In one aspect, if there is no active application, even when the UE 702 is attached to the LTE network and is connected to the initial-attach PDN, the UE 702 S101 pre-registration procedure may be considered finished at this point. If there are active application(s), UE 702 may continue to acts 726 to 732.

With reference to act 722, the procedures described below may be used in eHRPD signaling transfer via S101 tunnel in this call flow. UE 702 generates an UL Information Transfer message (UL eHRPD message). The UL eHRPD message is transferred from UE 702 to the eNB 704 as a parameter in the UL Information Transfer. The eNB 704 sends Uplink S1 CDMA2000 Tunneling message (UL HRPD message, Sector ID) to the MME 706. The SectorID is statically configured in the eNB 704 and is included in the HRPD signaling and carried to eAN 708. The MME 706 selects an eHRPD access node address. In order to be able to distinguish S101 signaling transactions belonging to different UEs 702, an S101 Session ID is used to identify signaling related to that UE 702 on S101. The MME 706 sends a Direct Transfer Request message (S101 Session ID, SectorID, UL eHRPD message) to the eHRPD access node 708. The MME 706 determines the correct eHRPD access node 708 entity and address from the SectorID. Note that there may be an unambiguous mapping from the SectorID to the HRPD access node address. The eAN 708 sends signaling in the DL direction to the MME 706 using Direct Transfer Request message (S101 Session ID, DL eHRPD message). The S101 Session ID is used to associate the signaling to a particular UE 702. The MME 706 sends the information on to the eNB 704 using the Downlink S1 CDMA2000 Tunneling message (DL eHRPD message). The eNB 704 uses the DL Information Transfer message (DL eHRPD message) to transport the signaling the UE 702. In one aspect, if the UE 702 is handing over emergency sessions to eHRPD access, the UE 702 informs the eHRPD access that it is an emergency handover. In case the UE is in limited service state and does not have an IMSI or its IMSI is unauthenticated, IMEI is used as a Session ID. If the IMSI is unauthenticated, the IMSI may also be provided on the S101 tunnel to the eHRPD access with an indication that it is unauthenticated.

At act 726, UE 702 and HSGW 710 may perform LCP negotiation over the S101 tunnel. In one aspect, if the eHRPD Access Node 708 is not configured to support emergency handovers, then eAN 708 may reject handover requests that indicate Emergency Handover.

At act 728a, UE 702 may perform EAP-AKA' authentication with HSGW 710. At act 728b, GPP2 AAA server 712 may authenticate and authorize UE 702 for access in the eHRPD system. In such an aspect, the 3GPP2 AAA server 712 may query HSS 714 and return a subscription profile, and APN and P-GW address pairs for each PDN connection to HSGW 710. In one aspect, HSGW may store information received from HSS/AAA 714. In one aspect, if UE 702 is performing an Emergency handover to eHRPD access for emergency service and the eHRPD access supports Emergency handover, the eHRPD access may skip the authentication procedure, or the eHRPD access accepts that the authentication may fail and may continue the handover procedure. Further, a statically configured P-GW may be selected by the eHRPD access for the UE 702 as an unauthenticated UE. In one aspect, completion of acts 726 and 728a/728b may be used to indicate completion of another check point as discussed above.

At act 730, UE 702 may exchange messages with HSGW 710 to establish/maintain one or more PDN connections. In one aspect, UE 702 may exchange VSNCP messages with the HSGW 710 for each PDN connection that it currently has attachments to within E-UTRAN and that it wants to maintain on eHRPD. In such an aspect, the UE may set the VSNCP Configure Request message Attach Type to "handover" and include the IP address(es) obtained via LTE. If the PDN Type is IPv6 or IPv4v6, UE 702 may include the IPv6 HSGW Link Local Address interlace ID (IID) option and may set the value to all zeros in the VSNCP Configure Request message. If the PDN Type is IPv4 or IPv4v6, the UE may include the IPv4 default router address and sets the value to 0.0.0.0 in the VSNCP Configure Request message, if it does not have the currently assigned IPv4 default router address. The UE may include the same list of the PCO option as the case when the UE directly operates over the eHRPD radio interface and may include the BCM parameter in the PCO option if network initiated QoS is supported. In one aspect, UE 702 may create PDN connections for APNs that are enabled in an eHRPD network. HSGW 710 may respond with a VSNCP Configure ACK message that includes the IPv6 HSGW Link Local Address IID option and sets the value to the interface ID of the HSGW link local address. The HSGW 710 may also include an IPv4 Default Router Address Configuration option and may set the value to the pre-configured value in the HSGW 710. HSGW 710 may include a SelectedBCM in the VSNCP Configure ACK message if UE 702 included the MS Support of Network Requested Bearer Control indicator in the PCO option in the VSNCP Configure Request message. Upon receiving the VSNCP Configure ACK message, UE 702 may update parameters for which new values are received and keep other parameters (including the parameters in the PCO option) unchanged. In operation. UE 702 may skip RS/RA during the IPv6 address assignment procedure over S101. The HSGW 710 may exchange Gateway Control Session Establishment/ACK messages with PCRF to obtain QoS policy rules to perform bearer binding updates for active IP flows. Note that the HSGW 710 defers interaction with the P-GW until the UE 702 arrives in eHRPD, at which time HSGW 701 may send a PBU to the P-GW to complete the PDN connection. In one aspect, completion of act 730 may be used to indicate completion of another check point as discussed above.

At act 732, UE 702 may initiate resource reservation procedures to establish all dedicated bearers. If QoS is initiated by the UE 702 over eHRPD and the application has specified FlowProfileIDs, the AMSS initiates eHRPD QoS setup procedures over the tunnel based on the FlowProfile-IDs. In one aspect, for IPv4, UE 702 uses the IPv4 default router address obtained in the VSNCP Config-Ack message as the destination address of the RSVP message for that PDN. In another aspect, for IPv6, UE 702 uses the IPv6 HSGW Link Local address as the destination address of the RSVP message for that PDN. The QoS reservation(s) may not be turned on after being established. In one aspect, completion of act 732 may be used to indicate completion of another check point as discussed above. If QoS failure occurs, the UE may not report to the application unless the failure happens after the UE transitions to eHRPD, rather the UE 702 may perform QoS retry as discussed with reference to FIG. 8.

At this point the UE 702 has completed pre-registration in the eHRPD access system and it has been authenticated by the HSS/AAA 714.

FIG. 8 is a flow chart 800 of a method of wireless communication in which a failure is detected in a pre-registration procedure. Generally, the UE may determine check points, as listed in Table 2, for retrying the failed HRPD pre-registration procedures. Each check point defines a procedure, and the UE can retry the failed procedure defined by the check point. At block 802, the UE determines whether there is a need to perform a data only (DO) session pre-registration procedure. If at block 802 the UE determines that no DO session pre-registration is needed, then at block 804 the process may go to block 838. By contrast, if at block 802 the UE decides DO pre-registration is needed, then a block 806, the UE determines whether a failure has occurred in signal transmissions associated with session negotiations. If at block 806, the UE determines a failure has occurred in signal transmissions associated with session negotiations, then at block 808 the UE determines is the failure is a permanent LTE connection failure. Table 1, indexes 6 and 9 provide examples of permanent LTE connection failure and indexes 1-5, 7, and 8 provide examples of temporary LTE connection failures. If, at block 808, the LTE connection failure is determined to be a permanent failure, then at block 810, the UE may consider pre-regis-tration not allowed and may retry pre-registration after receiving a new pre-registration allowed indication. In one aspect, upon receiving a new pre-registration allowed indication, the process may retry DO session pre-registration and continue to block 818 to determine whether the pre-registration was successful.

By contrast, if at block 808, the failure is determined not to be a permanent LTE connection failure, then at block 812, the UE determines whether the detected session negotiation failure indicated a barring time. As used herein, a barring time may refer to a time duration during which a retry process may not occur. The UE may maintain a session negotiation backoff timer (e.g., PreRegBackoffTimer_DOSession) for the DO session negotiation procedure (e.g., check point 1 from Table 2). If at block 812, the UE determines the detected session negotiation failure indicated a barring time, then at block 814, the UE waits until the expiration of the barring time to attempt to re-try the pre-registration process. In one aspect, expiration of the barring time pre-registration may be attempted again and the process may continue to block 818 to determine whether the pre-registration was successful. If at block 812, the UE determines there is no barring time, then at block 816, the UE may retry the failed procedure with backoff defined by the PreRegBackoffTimer_DOSession value. In such an aspect, the UE may not retry to open/negotiate a session until the PreRegBackoffTimer_DOSession has expired. Further, the UE continues to retry to open/negotiate a session, if pre-registration is allowed, until session negotiation succeeds at block 818. In one aspect, the UE may fail in session negotiation after sending the signaling over tunneling. In such an aspect, session negotiation failure may happen when the UE is explicitly rejected by the network when trying to open/negotiate a session. Session negotiation failures may include repeated occurrence of: UATI assignment failures (e.g., five failures), the network closing the session before negotiation is completed (e.g., three or more times), any other repeated protocol negotiation failure, such as noncompliant signaling message field, message exchange timeout, etc.

In one aspect, the UE may also maintain a counter. If at block 818, pre-registration fails again, then a block 820, the UE determines whether service is now provided by a different LTE cell. If at block 820, the UE determines that service is being provided by a new LTE cell, then at block 824, the UE may reset the backoff timer and counter to zero. By contrast, if the UE determines no new LTE cell is providing service, then at block 822, the UE may increment the counter. Upon successful completion of block 818, the UE may reset the backoff timer and counter to zero.

If at block 806, the UE determines that the detected failure is not associated with signal transmissions for session negotiations, then at block 826, the UE determines if the failure is associated with a session negotiation failure. If at block 826, the UE determines the failure is due to a failure during session negotiations, then at block 828, the UE may retry the pre-registration process after expiration of the backoff timer corresponding to the failure cause.

If at block 830, the virtual connection setup is successful, then the UE may reset the backoff timer/counter associated with the failure cause to zero. In one aspect, where the retry is associated with a session negotiation failure, a successful retry may result in the process continuing to block 838. In another aspect, where the retry is associated with a virtual connection failure, a successful retry may result in the process continuing to block 844. If at block 830, the virtual connection setup is not successful, then at block 832, the UE may determine if there has been a change in Color Code. As used in an aspect herein, a Color Code may identify a serving network and/or base station. When the subnet of the sector changes, the color code changes. While a UE is operating over an S101 interface, it receives the color code of the eHRPD network through the system information block that the serving LTE network broadcasts. As such, a change in Color Code may indicate a different cell is supporting eHRPD service. If at block 832, the UE determines a change in Color Code has occurred, then at block 836, the backoff timer and associated counter may be reset and the UE may retry virtual connection setup. By contrast, if the UE does not detect a change in Color Code, then at block 834, the UE may increment the counter associated with the virtual connection failure timer, and may retry virtual connection setup upon expiration of the time indicated by the incremented timer associated with the failure cause at block 828.

By contrast, if at block 826, the UE determines there has not been a session negotiation failure, then at block 838 the UE determines whether there is a need to create PPP/IP/QoS context via pre-registration. If at block 838, the UE determines there is no need for creation of PPP/IP/QoS context through pre-registration, then at block 840 the process may continue to the end at block 888.

If, at block 838, the UE determines a need to create PPP/IP/QoS context through pre-registration, then at block 842, the UE determines if the detected failure is associated with a virtual connection failure. If at block 842, the UE determines that the detected failure is associated with a virtual connection failure, then as discussed above, at block 828, the UE may retry the pre-registration process after expiration of the backoff timer corresponding to the failure cause. For example, if UE fails to open a virtual connection for a data call over tunneling, the UE may retry to bring up the virtual connection with backoff as defined in Table 3.

If at block 842, the UE determines failure has not occurred during establishment of a virtual connection, then at block 844, the UE determines if failure has occurred during a LCP procedure. If at block 844, the UE determines failure has occurred as part of the LCP procedure, then at block 846, the UE may determine if the UE has moved to a region in which coverage is provided through DO services. If at block 846, the UE determines that service is provided through DO, then at block 848, the UE may clear the backoff timer and counter associated with the failure cause and allow retry of the failed procedure. In one aspect, if the UE has moved to a location in which it is receiving coverage directly through a DO network, then the UE may retry LCP procedures immediately if a DCTM throttling timer is not running. In such an aspect, if LCP succeeds in the direct mode, the PreRegBackoffTimer_LCP may be cleared. If LCP succeeds in the tunnel mode, the DCTM throttling timer in the current Subnet may be cleared. If there has not been a move by the UE to a region supported by DO coverage, then at block 850, the UE may retry the failed bearer establishment procedure upon expiration of timer associated with the failure cause (e.g., LCP backoff timer, etc.). In one aspect, the UE maintains a PreRegBackoffTimer_LCP for the LCP negotiation and authentication procedure (check point 2 in Table 2). In such an aspect, the UE maintains the LCP backoff timer across different LTE cells (e.g., the timer may be kept running when the UE moves to a LTE cell that does not allow pre-registration, and the UE may retry the failed LCP procedure if the associated backoff timer expires and the UE is in a cell that allows pre-registration). If at block 852, the retried procedure succeeds, then the process may continue at block 860. By contrast, if the at block 852, the retried procedure fails, then at block 854, the UE may determine if there has been a change in Color Code. If at block 854, the UE determines a change in Color Code has occurred, then at block 858, the backoff timer and associated counter may be reset and the process may return to block 846. If the UE does not detect a change in Color Code, then at block 856, the UE may increment the counter associated with the failure cause timer, and may return to block 846. In one aspect, if HRPD fallback upon EAP-AKA' service authentication failures is enabled, while in tunneling, the UE, rather than using the enabled fallback service, may reattempt EAP-AKA' service authentication with the associated backoff.

If at block 844, the UE determines that failure has not occurred as part the LCP procedure, then at block 860, the UE determines if the failure is associated with a PDN establishment procedure. Generally, if the procedures may occur in parallel, then retried procedure may be performed independently. For example, retry procedures for each PDN connection failure may occur independently. The UE may retry the failed procedure (if pre-registration is allowed) until it succeeds, or until the context is released on LTE. If at block 860, the UE determines a PDN establishment failure has occurred, then at block 862, the UE may determine if the UE has moved to a region in which coverage is provided through DO services. If at block 862, the UE determines that service is not provided through DO, then at block 864, the UE may retry of the failed procedure after the PDN backoff timer has expired. If at the PDN connection is determined not to be successful at block 872, then at block 874 the PDN backoff timer may be incremented and the process my return to block 862. By contrast, if at the retry is successful at block 872, then the process may continue to block 876. If there has been a move by the UE to a region supported by DO coverage, then at block 866, the UE may determine if there is an explicit rejection. If at block 866, the UE determines there is an explicit rejection, the backoff of PDN connection request may be maintained across LTE and eHRPD and, at block 870, the UE may allow for retry the PDN connection process upon expiration of the PDN connection failure timer. If at block 866, the UE determines the failure is due to any reasons other than a network explicit reject, then at block 868, the UE may allow for retry the PDN connection without waiting for the expiration of the PDN backoff timer.

If at block 860, the UE determines there are no PDN connection failures, then at block 876, the UE determines if there has been a failure in the dedicated bearer establishment procedure. If at block 876, the UE determines there has been a failure with establishing dedicated bearers, at block 878, the UE may determine if the UE has moved to a region in which coverage is provided through DO services. If at block 878, the UE determines that service is provided through DO, then at block 880, the UE may clear the backoff timer and counter associated with the failure cause and allow retry of the failed procedure. If there has not been a move by the UE to a region supported by DO coverage, then at block 882, the LTE may retry the failed bearer establishment procedure upon expiration of timer associated with the failure cause (e.g., QoS backoff timer, etc.). If at block 884, the UE determines the retry was not successful, then at block 886 the timer related to the failure cause (e.g., QoS backoff timer) may be incremented and the process may return to block 878.

If at block 876 it is determined that there has been no failure in dedicated bearer establishment, and/or if at block 884 the retry procedure is successful, then at block 888 the pre-registration procedure is successfully completed.

Figure 9:
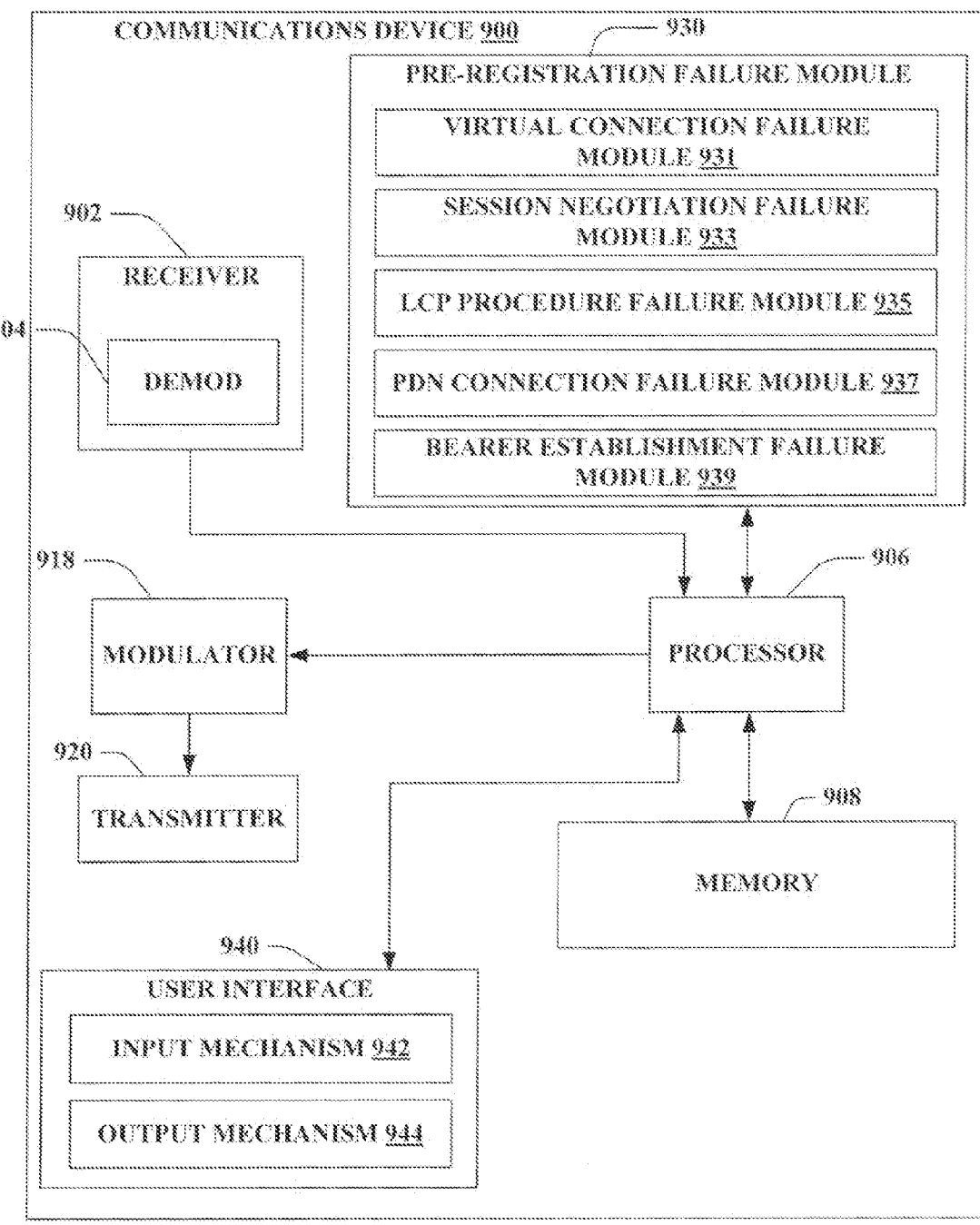
FIG. 9 is a conceptual block diagram illustrating a wireless communications device according to an aspect.

FIG. 9 illustrates an example architecture of user equipment 900. UE 900 comprises receiver 902 that receives a signal from, for instance, a receive antenna (not shown), performs typical actions on (e.g., filters, amplifies, downconverts, etc.) the received signal, and digitizes the conditioned signal to obtain samples. Receiver 902 can comprise a demodulator 904 that can demodulate received symbols and provide them to processor 906 for channel estimation. Processor 906 can be a processor dedicated to analyzing information received by receiver 902 and/or generating information for transmission by transmitter 920, a processor that controls one or more components of UE 900, and/or a processor that both analyzes information received by receiver 902, generates information for transmission by transmitter 920, and controls one or more components of UE 900.

UE 900 can additionally comprise memory 908 that is operatively coupled to processor 906 and that can store data to be transmitted, received data, information related to available channels, data associated with analyzed signal and/or interference strength, information related to an assigned channel, power, rate, or the like, and any other suitable information for estimating a channel and communicating via the channel.

Further, processor 906 can provide means for detecting one or more instances of failure during a pre-registration procedure as part of an optimized handover process, and means for performing one or more pre-registration retry processes based on the detected one or more instances of failure.

It will be appreciated that data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 908 of the subject systems and methods may comprise, without being limited to, these and any other suitable types of memory.

UE 900 can further include pre-registration failure module 930 which may be operable to provide retry assistance and/or timing upon detection of a failure to pre-register with an eHRPD network as part of an optimized handover procedure. In one aspect, pre-registration failure module 930 may include virtual connection failure module 931 that may be operable to assist in retrying pre-registration when failure is based on a virtual connection failure. In another aspect, pre-registration failure module 930 may include session negotiation failure module 933 that may be operable to assist in retrying pre-registration when failure is based on a session negotiation failure. In another aspect, pre-registration failure module 930 may include LCP procedure failure module 935 that may be operable to assist in retrying pre-registration when failure is based on a LCP procedure failure. In one aspect, pre-registration failure module 930 may include PDN connection failure module 937 that may be operable to assist in retrying pre-registration when failure is based on a PDN connection failure. Still further, if the pre-registration procedures can happen in parallel, then the retried procedure may also occur independently. For example, a retry procedure for each PDN may be performed independently. In one aspect, pre-registration failure module 930 may include bearer establishment failure module 939 that may be operable to assist in retrying pre-registration when failure is based on a bearer establishment failure. Further description associated with the implementation of the various pre-registration failure module 930 components is provided with reference to FIGS. 7 and 8. Additionally, examples of timer that may be used in associated with modules 931, 933, 935, 937, and 939 are provided in Table 3. Note, with reference to Table 3, different backoff timers may use different back off timers and may be measured in units of seconds and/or minutes depending on the timer. Further, as described in Table 3, values included in the brackets (e.g., {5, 5, 5, 15, 30, 60, 120}) indicate a time duration to be used for each counter value. For example, a first backoff time may last five seconds, while a sixth backoff time may last 60 seconds. One of ordinary skill in the art would understand that the values given Table 3 are presented merely for illustrative purposes and do not limit the scope of the claimed subject matter.

TABLE 3

Pre-Registration Backoff Timers

| Name | Unit | Default | Description |
| --- | --- | --- | --- |
| PreRegBackoffTimer_DOSession | Seconds | {5, 5, 5, 15, 30, 60, 120} and stays at 120 afterwards - For temporary LTE connection failures 180 - For DO session negotiation failures | Identifies the period of time, counted from the time when the failure happens, during which the failed DO session negotiation procedure shall not be reattempted. Upon its expiry, the UE shall retry the failed procedure. If the failure is due to temporary LTE connection failures and the LTE stack returns the barring time, the backoff timer shall be set to the LTE barring time. |

TABLE 3-continued

Pre-Registration Backoff Timers

| Name | Unit | Default | Description |
| --- | --- | --- | --- |
| PreRegBackoffTimer_VirtualConn | Seconds | {15, 15, 15, 30, 60, 120} and stays at 120 afterwards | Identifies the period of time, counted from the time when the failure occurs while trying to bring up the virtual connection for a data call, during which the UE shall not reattempt to open the virtual connection. Upon its expiry, the UE shall retry to open the virtual connection. If the failure is due to temporary LTE connection failures and the LTE stack returns the barring time, the backoff timer shall be set to the LTE barring time. |
| ServiceAuthFailureType | Enum | Soft | Identifies whether explicit EAP-AKA' service authentication failures are considered to be soft or hard PPP failures. |
| PreRegBackoffTimer_LCP | Minutes | {0, 0, 1, 2, 8, 15} and stays at 15 afterward - For PPP soft failures 60 - For PPP hard failures | Identifies the period of time, counted from the time when the failure happens, during which the failed LCP procedure shall not be reattempted. Upon its expiry, the UE shall retry the failed procedure. |
| PreRegBackoffTimer_PDN | Minutes | {0, 0, 1, 2, 8, 15} and stays at 15 afterwards | Identifies the period of time, counted from the time when the failure happens, during which the failed PDN connection setup procedure shall not be reattempted. Upon its expiry, the UE shall retry the failed procedure. |
| PreRegBackoffTimer_QoS | Minutes | {0, 0, 1, 2, 4, 8} and stays at 8 afterwards | Identifies the period of time, counted from the time when the failure happens, during which the failed QoS setup procedure shall not be reattempted. Upon its expiry, the UE shall retry the failed procedure. |

Additionally, UE 900 may include user interface 940. User interface 940 may include input mechanisms 942 for generating inputs into UE 900, and output mechanism 942 for generating information for consumption by the user of the UE 900. For example, input mechanism 942 may include a mechanism such as a key or keyboard, a mouse, a touch-screen display, a microphone, etc. Further, for example, output mechanism 944 may include a display, an audio speaker, a haptic feedback mechanism, a Personal Area Network (PAN) transceiver, etc.

FIG. 10 is a flow chart 1000 of a method of wireless communication in which a failure is detected in a pre-registration procedure. At block 1002, the UE may detect one or more instances of failure during a pre-registration procedure as part of an optimized handover process. In one aspect, the optimized handover process includes pre-registration of the UE with an eHRPD network over an LTE radio connection. In one aspect, the UE may determine a permanent LTE connection failure. In one aspect, the pre-registration procedure may include one or more check points. In one aspect, the UE may determine whether the failure occurs during transmissions of signals for session negotiation.

At block 1004, the UE may perform one or more pre-registration retry processes based on the detected one or more instances of failure. In one aspect, retrying of the pre-registration process may include performing a portion of the pre-registration procedure from a point after the one or more checkpoints, discussed above, at which the failure is detected. In one aspect, the UE may retry at least a portion of the pre-registration process after expiration of a timer associated with a detected failure, as discussed above in FIG. 8. For example, in one aspect, the UE may retry the pre-registration process after expiration of a session negotiation backoff timer upon a determination that the failure is during transmitting signaling for session negotiation. In another example aspect, the UE may retry the pre-registration process after expiration of the session negotiation backoff timer.

Figure 11:
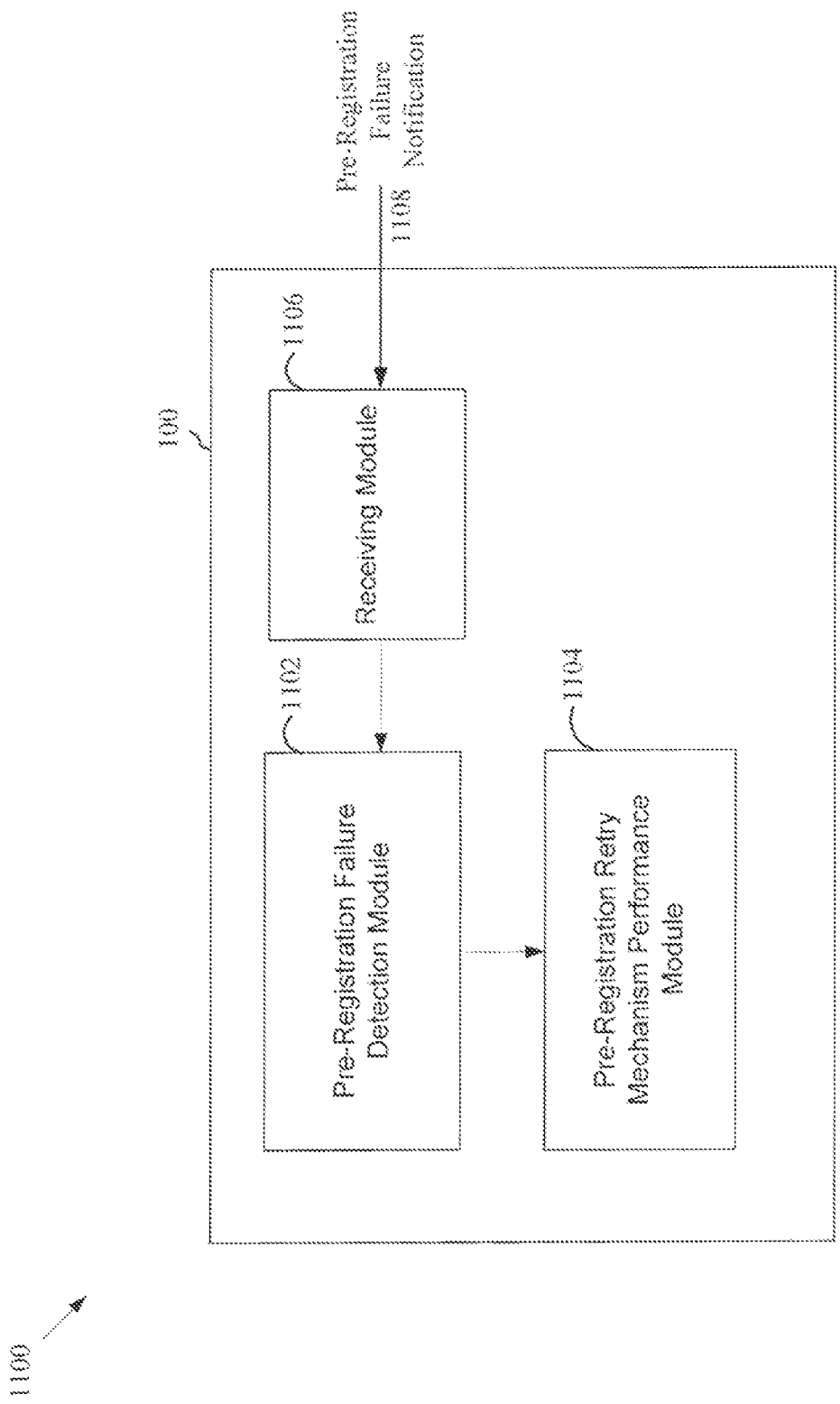
FIG. 11 is a conceptual block diagram illustrating the functionality of an example apparatus.

In one aspect, the method described in FIGS. 8 and/or 10 may be implemented by one or more modules and/or apparatuses, such as those described with respect to FIGS. 9 and 11.

FIG. 11 is a conceptual block diagram 1100 illustrating the functionality of an example apparatus 100. The apparatus 100 includes a module 1102 that detects failure of a pre-registration procedure based on reception of one or more pre-registration failure notifications 1108 from receiving module 1106. The apparatus 100 further includes a pre-registration retry mechanism performance module 1104 that determines and performs a retry mechanism based on the detected failure. The apparatus 100 may include additional modules that perform each of the steps in the aforementioned flow charts. As such, each step in the aforementioned flow charts may be performed by a module and the apparatus 100 may include one or more of those modules.

In one configuration, one or more of the modules (1102, 1104, 1106) associated with apparatus 100 for wireless communication provides means for detecting one or more instances of failure during a pre-registration procedure as part of an optimized handover process, and means for performing one or more pre-registration retry processes based on the detected one or more instances of failure. In one aspect, the pre-registration retry mechanism performance module 1104 may include means for retrying pre-registration upon receipt of a new pre-registration notification upon a detection of a permanent LTE connection failure. In such an aspect, the pre-registration detection module 1102 may include means for detecting that the UE is detached from the LTE network, or means for detecting that the UE is out of LTE service. In one aspect, the pre-registration detection module 1102 may include means for detecting whether the failure is part of a session negotiation. In such an aspect, the pre-registration retry mechanism performance module 1104 may include means for retrying the pre-registration process after expiration of a session negotiation backoff timer upon a determination that the failure is during transmitting signaling for session negotiation. In another such aspect, the pre-registration retry mechanism performance module 1104 may include means for retrying the pre-registration process after expiration of the session negotiation backoff timer. The baring time may be used for the session negotiation backoff timer value when it is indicated with the detection of the failure. In another configuration, apparatus 100 includes means for determining that the UE has moved to a different LTE cell, means for resetting the session negotiation backoff timer, means for resetting a counter associated with the session negotiation timer, and means for retrying the pre-registration procedure. In one aspect, the pre-registration retry mechanism performance module 1104 may include means for retrying the pre-registration procedure upon expiration of a backoff timer associated with the detected one or more instances of failure. In such an aspect, the one or more instances of failure include at least one of a session negotiation failure, a virtual connection failure when bringing up a data call, or a link control protocol (LCP) failure. In another configuration, apparatus 100 may include means for determining that the UE has detected a Color Code change, means for resetting a retry backoff timer related to the detected one or more instances of failure, means for resetting a counter associated with the retry backoff timer, and means for retrying the pre-registration procedure. In one aspect, the pre-registration detection module 1102 may include means for determining whether the failure is due to a network explicit rejection and whether the UE has handed over to an eHRPD network. In such an aspect, the pre-registration retry mechanism performance module 1104 may include means for retrying a PDN connection establishment procedure upon expiration of a PDN connection backoff timer and upon a determination that then UE has not handed over to the eHRPD supported network, or means for retrying of the PDN connection establishment procedure upon expiration of the PDN connection backoff timer upon the determination that the UE has handed over to the eHRPD network and upon a determination that the failure is due to the network explicit rejection, or means for retrying of the PDN connection establishment procedure prior to the expiration of the PDN connection backoff timer upon the determination that the UE has handed over to the eHRPD network and upon a determination that the failure is not due to the network explicit rejection. In one aspect, the pre-registration detection module 1102 may include means for determining whether the UE has handed over to a eHRPD network. In such an aspect, the pre-registration retry mechanism performance module 1104 may include means for retrying a dedicated bearer establishment procedure upon expiration of a quality of Server (QoS) backoff timer upon a determination that then UE has not handed over to the eHRPD network, or means for retrying of the dedicated bearer establishment prior to the expiration of the QoS backoff timer upon the determination that the UE has handed over to the eHRPD network. In one aspect, the pre-registration retry mechanism performance module 1104 may include means for performing a portion of the pre-registration procedure from a point after one or more checkpoints at which the failure is detected.

The aforementioned means may be one or more of the aforementioned modules of the apparatus 100 (see FIG. 9) and/or the processing system 114 configured to perform the functions recited by the aforementioned means. As described supra, the processing system 114 includes the TX Processor 568, the RX Processor 556, and the controller/processor 559. As such, in one configuration, the aforementioned means may be the TX Processor 568, the RX Processor 556, and the controller/processor 559 configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The word "exemplary" is used herein to mean serving as an example, instance, or illustration. Any aspect or design described herein as "exemplary" is not necessarily to be construed as preferred or advantageous over other aspects or designs. Additionally, as used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A method of wireless communications, comprising:
   detecting, by a user equipment (UE), one or more instances of failure during a pre-registration procedure with a first radio access network (RAN) through an air interface of a second RAN as part of an optimized handover process, wherein one instance of the one or more instances of failure comprises a dedicated bearer establishment failure and wherein the detecting further comprises determining whether the UE has handed over to an evolved high rate packet data (eHRPD) network;
   determining, by the UE, whether the one or more instances of failure include an instance of failure at the air interface of the second RAN; and
   performing, by the UE, one or more pre-registration retry processes with the first RAN through the air interface of the second RAN based on the detected one or more instances of failure when the one or more instances of failure do not include an instance of failure at the air interface of the second RAN, wherein the performing further comprises:
      retrying a dedicated bearer establishment procedure upon expiration of a quality of Server (QoS) backoff timer upon a determination that then UE has not handed over to the eHRPD network; or
      allowing retrying of the dedicated bearer establishment prior to the expiration of the QoS backoff timer upon the determination that the UE has handed over to the eHRPD network,
   wherein the pre-registration procedure includes one or more check points; and
   wherein the performing comprises performing a portion of the pre-registration procedure from a point after the one or more check points at which the failure is detected, the pre-registration procedure being barred from restarting until after expiration of a timer associated with the detected failure.

2. The method of claim 1, wherein the optimized handover process comprises pre-registration of the UE with an evolved high rate packet data (eHRPD) network over Long Term Evolution (LTE) radio connection, wherein the first RAN is the eHRPD network, wherein the air interface of the second RAN includes the LTE radio connection.

3. The method of claim 1, wherein the detecting further comprises determining a permanent Long Term Evolution (LTE) connection failure, wherein the instance of failure at the air interface includes the permanent LTE connection failure; and
   wherein the performing one or more pre-registration retry processes further comprises retrying pre-registration upon receipt of a new pre-registration notification.

4. The method of claim 3, wherein determining the permanent LTE failure comprises at least one of:
   detecting that the UE is detached from the LTE network; or
   detecting that the UE is out of LTE service.

5. The method of claim 1, wherein one instance of the one or more instances of failure comprises a temporary Long Term Evolution (LTE) connection failure, wherein the instance of failure at the air interface includes the temporary LTE connection failure; and
    wherein the detecting further comprises determining whether the failure occurs during transmissions of signals for session negotiation.

6. The method of claim 5, wherein the performing further comprises retrying the pre-registration process after expiration of a session negotiation backoff timer upon a determination that the failure is during transmitting signaling for session negotiation.

7. The method of claim 6, further comprising:
determining that the UE has moved to a different LTE cell;
resetting the session negotiation backoff timer;
resetting a counter associated with the session negotiation backoff timer; and
retrying the pre-registration procedure.

8. The method of claim 6, wherein the performing further comprises retrying the pre-registration process after expiration of the session negotiation backoff timer, wherein a barring time is used for the session negotiation backoff timer value when it is indicated with the detection of the failure.

9. The method of claim 1, wherein the one or more instances of failure comprises at least one of a session negotiation failure, a virtual connection failure when bringing up a data call, or a link control protocol (LCP) failure; and
    wherein the performing comprising retrying the pre-registration procedure upon expiration of a backoff timer associated with the detected one or more instances of failure.

10. The method of claim 9, further comprising:
determining that the UE has detected a Color Code change;
resetting a retry backoff timer related to the detected one or more instances of failure;
resetting a counter associated with the retry backoff timer; and
retrying the pre-registration procedure.

11. A method of wireless communications, comprising:
detecting, by a user equipment (UE), one or more instances of failure during a pre-registration procedure with a first radio access network (RAN) through an air interface of a second RAN as part of an optimized handover process, wherein one instance of the one or more instances of failure comprises a packet data network (PDN) connection failure, and wherein the detecting further comprises determining whether the failure is due to a network explicit rejection and whether the UE has handed over to an evolved high rate packet data (eHRPD) network;
determining, by the UE, whether the one or more instances of failure include an instance of failure at the air interface of the second RAN; and
performing, by the UE, one or more pre-registration retry processes with the first RAN through the air interface of the second RAN based on the detected one or more instances of failure when the one or more instances of failure do not include an instance of failure at the air interface of the second RAN, wherein the performing further comprises:
    retrying a PDN connection establishment procedure upon expiration of a PDN connection backoff timer and upon a determination that then UE has not handed over to the eHRPD supported network; or
    allowing retrying of the PDN connection establishment procedure upon expiration of the PDN connection backoff timer upon the determination that the UE has handed over to the eHRPD network and upon a determination that the failure is due to the network explicit rejection; or
    allowing retrying of the PDN connection establishment procedure prior to the expiration of the PDN connection backoff timer upon the determination that the UE has handed over to the eHRPD network and upon a determination that the failure is not due to the network explicit rejection,
wherein the pre-registration procedure includes one or more check points; and
wherein the performing comprises performing a portion of the pre-registration procedure from a point after the one or more check points at which the failure is detected, the pre-registration procedure being barred from restarting until after expiration of a timer associated with the detected failure.

12. A non-transitory computer-readable medium comprising code for:
detecting, by a user equipment (UE), one or more instances of failure during a pre-registration procedure with a first radio access network (RAN) through an air interface of a second RAN as part of an optimized handover process, wherein one instance of the one or more instances of failure comprises a dedicated bearer establishment failure and wherein the detecting further comprises determining whether the UE has handed over to an evolved high rate packet data (eHRPD) network;
determining, by the UE, whether the one or more instances of failure include an instance of failure at the air interface of the second RAN; and
performing, by the UE, one or more pre-registration retry processes with the first RAN through the air interface of the second RAN based on the detected one or more instances of failure when the one or more instances of failure do not include an instance of failure at the air interface of the second RAN, wherein the performing further comprises:
    retrying a dedicated bearer establishment procedure upon expiration of a quality of Server (QoS) backoff timer upon a determination that then UE has not handed over to the eHRPD network; or
    allowing retrying of the dedicated bearer establishment prior to the expiration of the QoS backoff timer upon the determination that the UE has handed over to the eHRPD network,
wherein the pre-registration procedure includes one or more check points; and
wherein the performing comprises performing a portion of the pre-registration procedure from a point after the one or more check points at which the failure is detected, the pre-registration procedure being barred from restarting until after expiration of a timer associated with the detected failure.

13. The non-transitory computer-readable medium of claim 12, wherein the optimized handover process comprises pre-registration of the UE with an evolved high rate packet data (eHRPD) network over Long Term Evolution (LTE) radio connection, wherein the first RAN is the eHRPD network, wherein the air interface of the second RAN includes the LTE radio connection.

14. The non-transitory computer-readable medium of claim 12, further comprising code for:

determining a permanent Long Term Evolution (LTE) connection failure, wherein the instance of failure at the air interface includes the permanent LTE connection failure; and retrying pre-registration upon receipt of a new pre-registration notification.

15. The non-transitory computer-readable medium of claim 14, further comprising code for at least one of:
detecting that the UE is detached from the LTE network; or
detecting that the UE is out of LTE service.

16. The non-transitory computer-readable medium of claim 12, wherein one instance of the one or more instances of failure comprises a temporary Long Term Evolution (LTE) connection failure, wherein the instance of failure at the air interface includes the temporary LTE connection failure; and
wherein the non-transitory computer-readable medium further comprises code for determining whether the failure occurs during transmissions of signals for session negotiation.

17. The non-transitory computer-readable medium of claim 16, further comprising code for retrying the pre-registration process after expiration of a session negotiation backoff timer upon a determination that the failure is during transmitting signaling for session negotiation.

18. The non-transitory computer-readable medium of claim 17, further comprising code for:
determining that the UE has moved to a different LTE cell;
resetting the session negotiation backoff timer;
resetting a counter associated with the session negotiation backoff timer; and
retrying the pre-registration procedure.

19. The non-transitory computer-readable medium of claim 17, further comprising code for retrying the pre-registration process after expiration of the session negotiation backoff timer, wherein a barring time is used for the session negotiation backoff timer value when it is indicated with the detection of the failure.

20. The non-transitory computer-readable medium of claim 12, wherein the one or more instances of failure comprises at least one of a session negotiation failure, a virtual connection failure when bringing up a data call, or a link control protocol (LCP) failure; and
wherein the non-transitory computer-readable medium further comprises code for retrying the pre-registration procedure upon expiration of a backoff timer associated with the detected one or more instances of failure.

21. The non-transitory computer-readable medium of claim 20, further comprising code for:
determining that the UE has detected a Color Code change;
resetting a retry backoff timer related to the detected one or more instances of failure;
resetting a counter associated with the retry backoff timer; and
retrying the pre-registration procedure.

22. A non-transitory computer-readable medium comprising code for:
detecting, by a user equipment (UE), one or more instances of failure during a pre-registration procedure with a first radio access network (RAN) through an air interface of a second RAN as part of an optimized handover process, wherein one instance of the one or more instances of failure comprises a packet data network (PDN) connection failure, and wherein the detecting further comprises determining whether the failure is due to a network explicit rejection and whether the UE has handed over to an evolved high rate packet data (eHRPD) network;
determining, by the UE, whether the one or more instances of failure include an instance of failure at the air interface of the second RAN; and
performing, by the UE, one or more pre-registration retry processes with the first RAN through the air interface of the second RAN based on the detected one or more instances of failure when the one or more instances of failure do not include an instance of failure at the air interface of the second RAN, wherein the performing further comprises:
retrying a PDN connection establishment procedure upon expiration of a PDN connection backoff timer and upon a determination that then UE has not handed over to the eHRPD supported network; or
allowing retrying of the PDN connection establishment procedure upon expiration of the PDN connection backoff timer upon the determination that the UE has handed over to the eHRPD network and upon a determination that the failure is due to the network explicit rejection; or
allowing retrying of the PDN connection establishment procedure prior to the expiration of the PDN connection backoff timer upon the determination that the UE has handed over to the eHRPD network and upon a determination that the failure is not due to the network explicit rejection,
wherein the pre-registration procedure includes one or more check points; and
wherein the performing comprises performing a portion of the pre-registration procedure from a point after the one or more check points at which the failure is detected, the pre-registration procedure being barred from restarting until after expiration of a timer associated with the detected failure.

23. An apparatus for wireless communications, comprising:
means for detecting, by a user equipment (UE), one or more instances of failure during a pre-registration procedure with a first radio access network (RAN) through an air interface of a second RAN as part of an optimized handover process, wherein one instance of the one or more instances of failure comprises a dedicated bearer establishment failure and wherein the detecting further comprises determining whether the UE has handed over to an evolved high rate packet data (eHRPD) network;
means for determining, by the UE, whether the one or more instances of failure include an instance of failure at the air interface of the second RAN; and
means for performing, by the UE, one or more pre-registration retry processes with the first RAN through the air interface of the second RAN based on the detected one or more instances of failure when the one or more instances of failure do not include an instance of failure at the air interface of the second RAN, wherein the performing further comprises:
means for retrying a dedicated bearer establishment procedure upon expiration of a quality of Server (QoS) backoff timer upon a determination that then UE has not handed over to the eHRPD network; or
means for allowing retrying of the dedicated bearer establishment prior to the expiration of the QoS backoff timer upon the determination that the UE has handed over to the eHRPD network, wherein the pre-registration procedure includes one or more check points; and wherein the means for performing further comprises means for performing a portion of the pre-registration procedure from a point after the one or more check points at which the failure is detected, the pre-registration procedure being barred from restarting until after expiration of a timer associated with the detected failure.

24. The apparatus of claim 23, wherein the optimized handover process comprises pre-registration of the UE with an evolved high rate packet data (eHRPD) network over Long Term Evolution (LTE) radio connection, wherein the first RAN is the eHRPD network, wherein the air interface of the second RAN includes the LTE radio connection.

25. The apparatus of claim 23, wherein the means for detecting further comprises means for determining a permanent Long Term Evolution (LTE) connection failure, wherein the instance of failure at the air interface includes the permanent LTE connection failure; and wherein the means for performing one or more pre-registration retry processes further comprises means for retrying pre-registration upon receipt of a new pre-registration notification.

26. The apparatus of claim 25, wherein means for determining the permanent LTE failure comprises at least one of:
means for detecting that the UE is detached from the LTE network; or
means for detecting that the UE is out of LTE service.

27. The apparatus of claim 23, wherein one instance of the one or more instances of failure comprises a temporary Long Term Evolution (LTE) connection failure, wherein the instance of failure at the air interface includes the temporary LTE connection failure; and wherein the means for detecting further comprises means for determining whether the failure occurs during transmissions of signals for session negotiation.

28. The apparatus of claim 27, wherein the means for performing further comprises means for retrying the pre-registration process after expiration of a session negotiation backoff timer upon a determination that the failure is during transmitting signaling for session negotiation.

29. The apparatus of claim 28, further comprising:
means for determining that the UE has moved to a different LTE cell;
means for resetting the session negotiation backoff timer;
means for resetting a counter associated with the session negotiation backoff timer; and
means for retrying the pre-registration procedure.

30. The apparatus of claim 28, wherein the means for performing further comprises means for retrying the pre-registration process after expiration of the session negotiation backoff timer, wherein a barring time is used for the session negotiation backoff timer value when it is indicated with the detection of the failure.

31. The apparatus of claim 23, wherein the one or more instances of failure comprises at least one of a session negotiation failure, a virtual connection failure when bringing up a data call, or a link control protocol (LCP) failure; and
wherein the means for performing comprising means for retrying the pre-registration procedure upon expiration of a backoff timer associated with the detected one or more instances of failure.

32. The apparatus of claim 31, further comprising:
means for determining that the UE has detected a change in a Color Code;

means for resetting a retry backoff timer related to the detected one or more instances of failure;
means for resetting a counter associated with the retry backoff timer; and
means for retrying the pre-registration procedure.

33. An apparatus for wireless communications, comprising:
means for detecting, by a user equipment (UE), one or more instances of failure during a pre-registration procedure with a first radio access network (RAN) through an air interface of a second RAN as part of an optimized handover process, wherein one instance of the one or more instances of failure comprises a packet data network (PDN) connection failure, and wherein the detecting further comprises determining whether the failure is due to a network explicit rejection and whether the UE has handed over to an evolved high rate packet data (eHRPD) network;
means for determining, by the UE, whether the one or more instances of failure include an instance of failure at the air interface of the second RAN; and
means for performing, by the UE, one or more pre-registration retry processes with the first RAN through the air interface of the second RAN based on the detected one or more instances of failure when the one or more instances of failure do not include an instance of failure at the air interface of the second RAN, wherein the performing further comprises:
means for retrying a PDN connection establishment procedure upon expiration of a PDN connection backoff timer and upon a determination that then UE has not handed over to the eHRPD supported network; or
means for allowing retrying of the PDN connection establishment procedure upon expiration of the PDN connection backoff timer upon the determination that the UE has handed over to the eHRPD network and upon a determination that the failure is due to the network explicit rejection; or
means for allowing retrying of the PDN connection establishment procedure prior to the expiration of the PDN connection backoff timer upon the determination that the UE has handed over to the eHRPD network and upon a determination that the failure is not due to the network explicit rejection,
wherein the pre-registration procedure includes one or more check points; and
wherein the performing comprises performing a portion of the pre-registration procedure from a point after the one or more check points at which the failure is detected, the pre-registration procedure being barred from restarting until after expiration of a timer associated with the detected failure.

34. An apparatus for communications, comprising:
a memory; and
at least one processor coupled to the memory and configured to:
detect one or more instances of failure during a pre-registration procedure with a first radio access network (RAN) through an air interface of a second RAN as part of an optimized handover process, wherein one instance of the one or more instances of failure comprises a dedicated bearer establishment failure and wherein the detecting further comprises determining whether the UE has handed over to an evolved high rate packet data (eHRPD) network;

determine whether the one or more instances of failure include an instance of failure at the air interface of the second RAN; and performing one or more pre-registration retry processes with the first RAN through the air interface of the second RAN based on the detected one or more instances of failure when the one or more instances of failure do not include an instance of failure at the air interface of the second RAN, wherein the performing further comprises:

retrying a dedicated bearer establishment procedure upon expiration of a quality of Server (QoS) backoff timer upon a determination that then UE has not handed over to the eHRPD network; or allowing retrying of the dedicated bearer establishment prior to the expiration of the QoS backoff timer upon the determination that the UE has handed over to the eHRPD network, wherein the pre-registration procedure includes one or more check points; and wherein the performing comprises performing a portion of the pre-registration procedure from a point after the one or more check points at which the failure is detected, the pre-registration procedure being barred from restarting until after expiration of a timer associated with the detected failure.

35. The apparatus of claim 34, wherein the optimized handover process comprises pre-registration of the UE with an evolved high rate packet data (eHRPD) network over Long Term Evolution (LTE) radio connection, wherein the first RAN is the eHRPD network, wherein the air interface of the second RAN includes the LTE radio connection.

36. The apparatus of claim 34, wherein the pre-registration failure module is further configured to:

determine a permanent Long Term Evolution (LTE) connection failure, wherein the instance of failure at the air interface includes the permanent LTE connection failure; and retry pre-registration upon receipt of a new pre-registration notification.

37. The apparatus of claim 36, wherein the pre-registration failure module is further configured to detect at least one of:

that the UE is detached from the LTE network; or that the UE is out of LTE service.

38. The apparatus of claim 34, wherein one instance of the one or more instances of failure comprises a temporary Long Term Evolution (LTE) connection failure, wherein the instance of failure at the air interface includes the temporary LTE connection failure; and wherein the pre-registration failure module is further configured to determine whether the failure occurs during transmissions of signals for session negotiation.

39. The apparatus of claim 38, wherein the pre-registration failure module is further configured to retry the pre-registration process after expiration of a session negotiation backoff timer upon a determination that the failure is during transmitting signaling for session negotiation.

40. The apparatus of claim 39, wherein the pre-registration failure module is further configured to:

determine that the UE has moved to a different LTE cell;

reset the session negotiation backoff timer;

reset a counter associated with the session negotiation backoff timer; and retry the pre-registration procedure.

41. The apparatus of claim 39, wherein the pre-registration failure module is further configured to retry the pre-registration process after expiration of the session negotiation backoff timer, wherein a barring time is used for the session negotiation backoff timer value when it is indicated with the detection of the failure.

42. The apparatus of claim 34, wherein the one or more instances of failure comprises at least one of a session negotiation failure, a virtual connection failure when bringing up a data call, or a link control protocol (LCP) failure; and wherein the pre-registration failure module is further configured to retry the pre-registration procedure upon expiration of a backoff timer associated with the detected one or more instances of failure.

43. The apparatus of claim 34, wherein the pre-registration failure module is further configured to:

determine that the UE has detected a Color Code change;

reset a retry backoff timer related to the detected one or more instances of failure;

reset a counter associated with the retry backoff timer; and retry the pre-registration procedure.

44. An apparatus for communications, comprising:

a memory; and at least one processor coupled to the memory and configured to:

detect one or more instances of failure during a pre-registration procedure with a first radio access network (RAN) through an air interface of a second RAN as part of an optimized handover process, wherein one instance of the one or more instances of failure comprises a packet data network (PDN) connection failure;

determine whether the one or more instances of failure include an instance of failure at the air interface of the second RAN; and perform one or more pre-registration retry processes with the first RAN through the air interface of the second RAN based on the detected one or more instances of failure when the one or more instances of failure do not include an instance of failure at the air interface of the second RAN, wherein to perform the one or more pre-registration retry processes, the at least one processor is further configured to:

determine whether the failure is due to a network explicit rejection and whether the UE has handed over to an evolved high rate packet data (eHRPD) network; and retry a PDN connection establishment procedure upon expiration of a PDN connection backoff timer and upon a determination that then UE has not handed over to the eHRPD supported network; or allow retrying of the PDN connection establishment procedure upon expiration of the PDN connection backoff timer upon the determination that the UE has handed over to the eHRPD network and upon a determination that the failure is due to the network explicit rejection; or allow retrying of the PDN connection establishment procedure prior to the expiration of the PDN connection backoff timer upon the determination that the UE has handed over to the eHRPD network and upon a determination that the failure is not due to the network explicit rejection, wherein the pre-registration procedure includes one or more check points; and wherein the performing comprises performing a portion of the pre-registration procedure from a point after the one or more check points at which the failure is detected, the pre-registration procedure being barred from restarting until after expiration of a timer associated with the detected failure.

* * * * *